(12) United States Patent
Yoshida et al.

(10) Patent No.: US 11,802,975 B2
(45) Date of Patent: Oct. 31, 2023

(54) NAVIGATION SATELLITE SYSTEM RECEPTION DEVICE, METHOD FOR PROCESSING NAVIGATION SATELLITE SIGNAL FROM SAME, AND PROGRAM

(71) Applicant: Nippon Telegraph and Telephone Corporation, Tokyo (JP)

(72) Inventors: Seiji Yoshida, Musashino (JP); Masakatsu Fujiwara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 410 days.

(21) Appl. No.: 17/259,332

(22) PCT Filed: Jul. 11, 2019

(86) PCT No.: PCT/JP2019/027507
§ 371 (c)(1),
(2) Date: Jan. 11, 2021

(87) PCT Pub. No.: WO2020/013227
PCT Pub. Date: Jan. 16, 2020

(65) Prior Publication Data
US 2021/0239846 A1 Aug. 5, 2021

(30) Foreign Application Priority Data
Jul. 13, 2018 (JP) .................. 2018-133073

(51) Int. Cl.
*G01S 19/30* (2010.01)
*G01S 19/22* (2010.01)
(Continued)

(52) U.S. Cl.
CPC .............. *G01S 19/30* (2013.01); *G01S 19/22* (2013.01); *G01S 19/28* (2013.01); *G01S 19/37* (2013.01)

(58) Field of Classification Search
CPC .......... G01S 19/22; G01S 19/28; G04R 20/04
See application file for complete search history.

(56) References Cited

U.S. PATENT DOCUMENTS

| 6,448,927 B1* | 9/2002 | Ishigaki ................. G01S 19/34 |
| | | 342/357.31 |
| 9,985,805 B1* | 5/2018 | Swenholt ............. H04B 1/0017 |

(Continued)

FOREIGN PATENT DOCUMENTS

| JP | 2010-534849 | 11/2010 |
| JP | 2017-219542 | 12/2017 |
| JP | 2017219542 A * | 12/2017 |

OTHER PUBLICATIONS

Kubo et al., "A Study on GPS Multipath Mitigation and its Practicability for High Precise Positioning," University of Marine Science and Technology, Tokyo, 2005, 593 pages (with English Translation).

(Continued)

*Primary Examiner* — Bernarr E Gregory
*Assistant Examiner* — Fred H Mull
(74) *Attorney, Agent, or Firm* — Fish & Richardson P.C.

(57) ABSTRACT

A navigation satellite system reception apparatus includes a navigation satellite signal reception unit that calculates a first reception position, and a control unit that calculates an initial value of the first reception position and an orbit position of each of four or more navigation satellites, calculates, based on the calculated first reception position, the calculated orbit position, and time information from the first navigation satellite signals, arrival time of each of the first navigation satellite signals, extracts, based on the calculated arrival time, a second navigation satellite signal, calculates, based on the extracted second navigation satellite signal, a second reception position, recursively performs, by using the calculated second reception position, a calculation (Continued)

process of the arrival time and an extraction process of the second navigation satellite signal, and performs, based on a second navigation satellite signal extracted at end of recursive processing, the positioning process or the time synchronization process.

15 Claims, 19 Drawing Sheets

(51) Int. Cl.
*G01S 19/28* (2010.01)
*G01S 19/37* (2010.01)

(56) References Cited

U.S. PATENT DOCUMENTS

| | | | |
|---|---|---|---|
| 2010/0176992 A1 | 7/2010 | T'siobbel | |
| 2011/0140956 A1* | 6/2011 | Henry | G01S 19/34 |
| | | | 342/450 |
| 2013/0002480 A1* | 1/2013 | Pratt | G01S 19/28 |
| | | | 342/357.25 |

OTHER PUBLICATIONS

Yoshida et al., "Precision Improvement in GNSS Time Synchronization by mitigating the effect of multipath signals from NLOS satellites," National Conference of Positioning Navigation Society, 2017, 3 pages (with English Translation).

* cited by examiner

NAVIGATION SATELLITE SYSTEM RECEPTION DEVICE, METHOD FOR PROCESSING NAVIGATION SATELLITE SIGNAL FROM SAME, AND PROGRAM

CROSS-REFERENCE TO RELATED APPLICATIONS

This application is a National Stage application under 35 U.S.C. § 371 of International Application No. PCT/JP2019/027507, having an International Filing Date of Jul. 11, 2019, which claims priority to Japanese Application Serial No. 2018-133073, filed on Jul. 13, 2018. The disclosure of the prior application is considered part of the disclosure of this application, and is incorporated in its entirety into this application.

TECHNICAL FIELD

The present disclosure relates to a technique of a navigation satellite system for implementing highly accurate time synchronization and positioning even in an environment in which navigation satellite signals cannot be constantly received as visible satellite signals.

BACKGROUND ART

As a means of implementing highly accurate time (timing) synchronization between base stations which is necessary for a mobile communication system employing a Time Division Duplex (TDD) method, a Global Navigation Satellite System (GNSS), such as the Global Positioning System (GPS), has been increasingly put into use. GNSS satellites (navigation satellites) include a highly accurate atomic clock in synchronization with Coordinated Universal Time (UTC), and transmit navigation satellite signals in synchronization with UTC on radio waves. This allows for highly accurate time synchronization with UTC by receiving navigation satellite signals at any point on earth.

Navigation satellite signals transmitted from a navigation satellite have a propagation delay before arriving at a reception point. Thus, it is necessary to simultaneously receive signals of at least four navigation satellites to correct delay time and determine four parameters, i.e., three-dimensional coordinate information (x, y, z) of a reception position of a signal and a time difference (Δt) between a clock of a satellite and a clock of a receiver. In a case of the GPS, 24 or more navigation satellites are operated orbiting the earth approximately every 12 hours on six semi-synchronous orbits. To constantly implement positioning and time synchronization, it is necessary to select an environment in which at least four navigation satellites among the 24 or more navigation satellites can be constantly captured.

When a GNSS is used for the purpose of highly accurate time synchronization, the number of satellite (hereinafter visible satellite) signals that can be received as direct waves may be limited due to blocking of a line of sight space of navigation satellite signals around an antenna (hereinafter a navigation satellite antenna) for receiving navigation satellite signals with a building, a tree, or the like. In general, there is a tendency that base stations of a mobile communication system are installed at higher density in an urban area where there is a great demand of traffic. In the urban area; however, an area in which four or more navigation satellite signals can be constantly captured as direct waves is limited. Under such circumstances, highly accurately and stably implementing time synchronization even in an environment with an unsatisfactory reception state of navigation satellite signals in which it is difficult to constantly capture a sufficient number of navigation satellite signals as direct waves has been presenting a problem.

When positioning using navigation satellite signals or time synchronization with navigation satellite signals is performed, to enhance accuracy, it is effective to select a reception environment with a wide open space in which a larger number of visible satellite signals can be received as direct waves. In addition, it is expected that a larger number of visible satellites located in a distributed manner all over the sky leads to further enhancement of accuracy of positioning and time. As an index representing deterioration of accuracy due to imbalanced arrangement of satellites in the sky, an index referred to as Dilution Of Precision (DOP (a rate of deterioration of accuracy)) is in many cases used.

Examples of factors that affect accuracy other than those described above in positioning and time synchronization using navigation satellite signals include a case in which reception of reflected waves and diffracted waves (so-called multipath signals) of navigation satellite signals that are generated by reflection and diffraction due to a structure or the ground around a reception position.

FIG. 13 is a schematic diagram for describing an occurrence state of multipath signals. As illustrated in FIG. 13, types of multipath signals include a case with direct waves (multipath signal of visible satellite signals) and a case without direct waves (multipath signals of satellite (hereinafter invisible satellite) signals that cannot be received as direct waves). Regarding the former case, in a normal case in which received strength of direct waves is higher than received strength of multipath signals, measures to effectively reduce influence of multipath signals through relative signal processing in the navigation satellite signal reception apparatus have hitherto been studied (see NPL 1). In contrast, regarding multipath signals of invisible satellites without direct waves of the latter case, it is difficult to eliminate its influence except when the navigation satellite signals are not used for positioning and time synchronization, and thus has significant influence on positioning accuracy and time synchronization accuracy.

FIGS. 14 and 15 each illustrate an example of a reception state of multipath signals. As a result of receiving GPS satellite signals by installing a GPS satellite antenna in an environment surrounded by a building as illustrated in FIG. 14, as illustrated in the upper part of FIG. 15, it is confirmed that many invisible satellite signals blocked by the structure (in the example of FIG. 15, #2, #3, #5, #7. #12, #17, #19, #23, and #25) are received as multipath signals, in addition to visible satellite signals (in the example of FIG. 15, #6 and #9) that are located in the open space in the skyward image at the GPS satellite antenna installation position. As illustrated in the lower part of FIG. 15, regarding reception characteristics of GPS satellite signals over time as well, GPS satellite signals whose number is closer to the number of receiving satellites presupposing the open sky than the number of visible satellites that can be obtained through simulation from the open space in consideration of a structure around the GPS antenna are received. Here, "open sky" refers to a reception environment in which there is no blocking object around with an open sky above.

The multipath signals have a longer propagation path length in comparison with direct waves and reach the navigation satellite antenna with a propagation delay. As the distance from the navigation satellite antenna to a reflection point is increased, a propagation delay time difference with respect to direct waves of reflected waves is increased, and measurement errors of a pseudo distance is also increased. Here, the pseudo distance refers to a distance obtained by multiplying a difference between transmission time of a navigation satellite signal and time at which the navigation satellite signal reception apparatus receives the navigation satellite signal by the speed of light. As the measurement errors of the pseudo distance are increased, time synchronization accuracy and positioning accuracy are deteriorated.

FIG. 16 illustrates a configuration of an experimental system used to measure a difference (time errors) between time that is obtained by receiving GPS satellite signals in an environment in which multipath signals are caused and time that is obtained by receiving GPS satellite signals in an nearby open sky environment of FIGS. 14 and 15. The GPS satellite signals received in respective environments are input to two GPS receivers of the same type, and a phase difference of one Pulse Per Second (PPS) signals being timing output signals of time information being generated are measured over time by a time error measurement device. With this method, a degree of deterioration of time synchronization accuracy along with reception of multipath signals can be quantitatively measured. As a result, as shown in FIG. 17, it is confirmed that time that is generated from GPS satellite signals received in an environment in which multipath signals are caused is behind time that is generated from GPS satellite signals received in an open sky environment by at the maximum of 250 ns or more.

As has been described in the above, to enhance accuracy of time synchronization and positioning using navigation satellite signals in a non-ideal reception environment in which the surroundings of a reception position are blocked by a structure, it is necessary that as many visible satellite signals located all over the sky in a distributed manner as possible be received and influence from multipath signals be effectively eliminated.

To receive as many visible satellite signals located in an open space in the sky as possible as mentioned in the former case, it is effective to use a so-called multi-GNSS in which a plurality of navigation satellite systems are used in combination, in addition to selecting a reception position with an open space as wide as possible.

At the same time, as a method of reducing influence of multipath signals, various methods have hitherto been studied.

A gyration direction of circularly polarized wave characteristics of multipath signals is inverted at the time of reflection with a building or the like. By providing isolation characteristics dependent on the circularly polarized wave characteristics in the navigation satellite antenna with the use of the inversion of the circularly polarized wave characteristics due to the reflection, signal strength of reflected waves that are reflected an odd number of times can be attenuated. Signal strength of reflected waves from the ground or a low angle of elevation can be attenuated with directivity of a vertically upward direction of the navigation satellite antenna. The above is one method of reducing influence of multipath signals owing to the navigation satellite antenna.

In contrast, examples of methods of reducing influence of multipath signals that are implemented in the navigation satellite signal reception apparatus include a method of relatively performing weighting processing on navigation satellite signals used at the time of performing positioning or time synchronization depending on received strength or a Signal-to-Noise Ratio (SNR) of received navigation satellite signals, and of selecting navigation satellite signals to be used for positioning and time synchronization by a threshold of received strength or a Signal-to-Noise Ratio (SNR) of received navigation satellite signals. The method of the latter case is referred to as an SNR mask. When navigation satellite signals are reflected or diffracted on a building around a reception position, signal strength is attenuated depending on a material of the building of an angle of the reflection and diffraction. Thus, it is expected that visible satellite signals received as direct waves have a relatively high Signal-to-Noise Ratio (SNR) in comparison with invisible satellite signals with reflection and diffraction. In view of this, by selecting navigation satellite signals or using weights based on the Signal-to-Noise Ratio (SNR) of received navigation satellite signals, it is expected that a degree of contribution of visible satellite signals when performing positioning or time synchronization is enhanced and accuracy is improved. FIG. 17 shows results of measurement of time synchronization accuracy when navigation satellite signals are selected by using a threshold of a Carrier-to-Noise Ratio (CNR) being one index of a Signal-to-Noise Ratio (SNR). In the measurement of FIG. 17, it is confirmed that time errors are significantly improved to 100 ns or less as a result of generating time by selecting GPS satellite signals having a CNR of 35 dB-Hz or higher out of received GPS satellite signals.

The second method of reducing influence of multipath signals implemented in the navigation satellite signal reception apparatus will be described. As illustrated in FIG. 18, the height of a building around the navigation satellite antenna that reflects and diffracts navigation satellite signals is limited, and thus receivability of multipath signals depends on an angle of elevation of navigation satellite signals. A navigation satellite signal having a large angle of elevation with respect to a distance between a building and an installation position of a navigation satellite antenna is reflected at a small angle of reflection in a wall surface of the building in the vertical direction, and thus a reflected signal propagates in the ground direction and does not reach the navigation satellite antenna. In contrast, a navigation satellite signal having a small angle of elevation has a large angle of reflection in a wall surface of the building in the vertical direction, and thus it is likely that a reflected wave with a larger propagation delay time difference in comparison with a direct wave reaches the navigation satellite antenna. For such reasons, it is expected to reduce influence of multipath signals by filtering navigation satellite signals by using a threshold of an angle of elevation, using navigation satellite signals having a large angle of elevation for positioning and time synchronization, and thereby preferentially selecting visible satellite signals and invisible satellite signals with a small propagation delay. This method is referred to as an angle of elevation mask. FIG. 19 shows results of measurement of time synchronization accuracy when GPS satellite signals are selected by using a threshold of an angle of elevation in the reception environment of FIG. 14. As shown in FIG. 19, it is confirmed that time errors are improved along with an increase of the threshold of an angle of elevation.

The third method of reducing influence of multipath signals that is implemented in the navigation satellite signal reception apparatus is a method of preliminarily performing positioning and time synchronization arithmetic using a combination of navigation satellite signals of a subset of received navigation satellite signals, and selecting navigation satellite signals through statistic processing. In an air traffic control system or the like, to secure integrity of the navigation satellite system, a method referred to as Receiver Autonomous Integrity Monitoring (RAIM) for detecting navigation satellite signals not in a normal operation state through statistic signal processing and a method referred to as Fault Detection and Exclusion (FDE) of performing elimination in addition to detection are performed. There has been a study on a method of improving time synchronization accuracy by using a method of preferentially selecting visible satellite signals through similar statistic processing that focuses on the fact that multipath signals reach the navigation satellite antenna later than direct waves, and if the number of visible satellites is less than four, complementarily selecting invisible satellite signals having small propagation delay time (see NPL 2).

CITATION LIST

Non Patent Literature

NPL 1: Nobuaki Kubo, "A Study on GPS Multipath Mitigation and its Practicability for High Precise Positioning", doctoral thesis, Tokyo University of Marine Science and Technology, 2005

NPL 2: Seiji Yoshida et al., "Improvement of GNSS Time Synchronization Accuracy with Reduced Influence of Multipath Signals of Invisible Satellites", The Institute of Positioning, Navigation and Timing of Japan National Convention, 2017

SUMMARY OF THE INVENTION

Technical Problem

Below are some examples of problems in the conventional methods of reducing deterioration of accuracy caused by influence of invisible satellite signals in positioning and time synchronization using navigation satellite signals.

(1) Method of Performing Selection of Navigation Satellite Signal in Navigation Satellite Signal Reception Apparatus (1-1) Method Using Angle of Elevation Mask With a method using an angle of elevation mask of setting a threshold of an angle of elevation of navigation satellite signals and selecting navigation satellite signals to be used for positioning and time synchronization based on the threshold has a higher effect of application in a case that the open space has a shape close to a circle with the center being the zenith. However, in other general reception environments, this method may eliminate even visible satellite signals that originally contribute to enhancement of positioning and time synchronization accuracy. For example, in the reception environment of FIG. 19, when the angle of elevation threshold is set to 40 degrees, visible satellite signals located east in an open space are eliminated. For this reason, in some cases, selection of navigation satellite signals to be used for positioning and time synchronization may not be appropriately performed. When a set value of a threshold is strict (when a threshold of an angle of elevation is large), the number of navigation satellite signals necessary for positioning and time synchronization may not be temporarily secured. In contrast, when a set value of a threshold is loose (when a threshold of an angle of elevation is small), invisible satellite signals received as multipath signals without direct waves cannot be sufficiently eliminated, and accuracy may thus be deteriorated.

(1-2) Method Using SNR Mask

With a method using an SNR mask of setting a threshold to received signal strength, a signal-to-noise ratio, or the like of received navigation satellite signals and selecting navigation satellite signals to be used for positioning and time synchronization, an optimal threshold depends on states such as reception characteristics of the navigation satellite antenna, an installation environment of the navigation satellite antenna, sensitivity of the navigation satellite signal reception apparatus, an angle of elevation of the navigation satellites, and overlap of interference signals. In particular, interference signals may cause the signal-to-noise ratio of navigation satellite signals to vary over time. Interference signals may include jamming signals that are intentionally transmitted for the purpose of hindering reception of navigation satellite signals, signals to be used in mobile communication, or the like, and these interference signals cause the signal-to-noise ratio of navigation satellite signals to vary over time when a positional relationship between an interference signal source and a navigation satellite antenna or strength itself of interference signals vary over time.

In the SNR mask method, when a set value of a threshold is strict (when a threshold of received signal strength, a signal-to-noise ratio, or the like is large), the number of navigation satellite signals necessary for positioning and time synchronization may not be temporarily secured in a time span when the number of receivable visible satellite signals is reduced, for example. In contrast, when a set value of a threshold is loose (when a threshold of received signal strength, a signal-to-noise ratio, or the like is small), invisible satellite signals received as multipath signals without direct waves cannot be sufficiently eliminated, and accuracy may be deteriorated.

As described above, in the method using an SNR mask, when a level of overlapping interference signals varies over time, it is not necessarily easy to set an optimal threshold, and selection of navigation satellite signals appropriate for the use of positioning and time synchronization and navigation satellite signals inappropriate therefor may not be correctly performed.

(2) Method of Receiving Navigation Satellite Signals and then Performing Correction Processing in Navigation Satellite Signal Reception Apparatus (2-1) Method Using Weighting Based on SNR In a method of using weighting at the time of signal processing on navigation satellite signals to be used for positioning and time synchronization by using received signal strength, a signal-to-noise ratio, or the like of received navigation satellite signals, when the number of invisible satellite signals received as multipath signals without direct waves is larger than the number of visible satellite signals that can be received as direct waves, contribution of invisible satellite signals may be relatively increased, and as a result, deterioration of accuracy may not be avoided.

(2-2) Method Using Weighting Based on Angle of Elevation

In a method of performing weighting on satellites with a large angle of elevation that are likely to be received as visible satellites, the number of satellites with a large angle of elevation may be reduced depending on positions of satellites over time, contribution of invisible satellite signals may be relatively increased, and as a result, deterioration of accuracy may not be avoided.

(3) Method of Attenuating Navigation Satellite Signals Inappropriate for Use in Navigation Satellite Antenna (3-1) Method Using Polarized Wave Isolation This is a method of attenuating signal strength of navigation satellite signals reflected an odd number of times in the navigation satellite antenna having isolation characteristics depending on circularly polarized waves with the use of inversion of a gyration direction of circularly polarized waves of reflected signals. In this method, although received strength of multipath signals can be attenuated to some degree, signals with strength of reception sensitivity of the navigation satellite signal reception apparatus or higher are received. Thus, the influence of multipath signals may not be eliminated. In addition, regarding signals reflected twice, a gyration direction is further inverted to return to the original direction, and thus attenuation cannot be achieved. For this reason, signals inappropriate for the use of positioning and time synchronization may not be sufficiently eliminated.

(3-2) Method Using Directivity Antenna

This is a method of attenuating reflected waves from the ground or a low angle of elevation with directivity of a vertically upward direction of the navigation satellite antenna. In this method, similarly to the above, although received signal strength of reflected waves can be attenuated to some degree, signals inappropriate for the use may not be sufficiently eliminated.

(4) Method of Performing Satellite Selection Using Statistic Processing

In a form of using so-called multi-GNSS, a larger number of visible satellites can be secured, and thus the form is effective in terms of enhancement of accuracy. However, in a method of performing satellite selection through statistic processing, there is a problem that a processing load of signals is exponentially increased along with an increase in the number of received navigation satellite signals. For this reason, in some cases, arithmetic for satellite selection may not be performed due to a limitation on resources for signal processing of a GNSS receiver, or satellite selection may not be timely performed because of a long computation time being required.

As described above, in the conventional technologies (1) to (4), selection of navigation satellite signals appropriate for the use in implementation of high-accuracy time synchronization or positioning and navigation satellite signals inappropriate therefor may not be correctly performed.

The present disclosure is made in view of the problems described above, and has an object to provide a navigation satellite system reception apparatus that can implement highly accurate time synchronization or positioning even in an environment with an unsatisfactory reception state of navigation satellite signals in which an open space for receiving navigation satellite signals is limited and invisible satellite signals are received as multipath signals without direct waves.

Means for Solving the Problem

To achieve the object described above, the disclosure of the present application relates to a navigation satellite system reception apparatus for performing, based on a plurality of navigation satellite signals received from a plurality of navigation satellites, at least one of positioning processing or time synchronization processing with one of the plurality of navigation satellites, the navigation satellite system reception apparatus including a navigation satellite signal reception unit configured to calculate, based on first navigation satellite signals of the plurality of navigation satellite signals simultaneously received from four or more navigation satellites of the plurality of navigation satellites, a first reception position and reception time, and a control unit configured to calculate, based on each of the first navigation satellite signals simultaneously receivable from the four or more navigation satellites, an initial value of the first reception position and an orbit position of each of the four or more navigation satellites, calculate, based on the first reception position and the orbit position that are both calculated and time information included in each of the first navigation satellite signals, arrival time of each of the first navigation satellite signals, extract, based on the arrival time that is calculated, a second navigation satellite signal from the first navigation satellite signals, calculate, based on the second navigation satellite signal that is extracted, a second reception position, recursively perform, by using the second reception position that is calculated, calculation processing of the arrival time, extraction processing of the second navigation satellite signal, and calculation processing of the second reception position, and perform control, based on a second navigation satellite signal from the first navigation satellite signals extracted at end of recursive processing, to perform the positioning processing or the time synchronization processing.

Effects of the Invention

According to the present disclosure, selection of navigation satellite signals appropriate for the use of time synchronization and positioning and navigation satellite signals inappropriate therefor can be correctly performed. Thus, it is expected to produce effects of implementing highly accurate time synchronization and positioning even in an environment with an unsatisfactory reception state of navigation satellite signals in which an open space for receiving navigation satellite signals is limited and invisible satellite signals are received as multipath signals without direct waves.

In the form of simultaneously performing positioning and time synchronization by using four or more navigation satellite signals, the following effects can be expected.

(A) Visible satellites and invisible satellites having a smaller propagation delay are complementarily selected as necessary, regardless of the number of visible satellites in a reception environment. Thus, it is expected to produce an effect of implementing highly accurate time synchronization and positioning by dynamically and adaptively selecting optimal navigation satellite signals in a reception environment and reception time.

(B) It is expected that influence of multipath signals is effectively eliminated, regardless of reception characteristics of a navigation satellite antenna or performance of the navigation satellite signal reception apparatus.

(C) By appropriately setting parameter values according to a reception environment, it is expected to produce an effect of stably implementing highly accurate time synchronization and positioning in any reception environment including not only unsatisfactory reception environment in which the number of visible satellites is small and many multipath signals of invisible satellites are received, but also any reception environment including an open sky reception environment.

(D) In the present disclosure, selection of at least four or more navigation satellite signals to be used for time synchronization and positioning is performed out of received navigation satellite signals. This does not cause a risk that a necessary number of navigation satellites is not secured, which has been a problem in methods of related art of selecting navigation satellite signals to be used for positioning and time synchronization by setting a threshold on received signal strength of received navigation satellite signals, a signal-to-noise ratio, an angle of elevation, or the like.

(E) In the present disclosure, there is no need to implement circular polarization isolation characteristics and directivity in the vertical direction in the navigation satellite antenna. Thus, as a secondary effect, costs for the navigation satellite antenna can be reduced.

DESCRIPTION OF EMBODIMENTS

Figure 1:
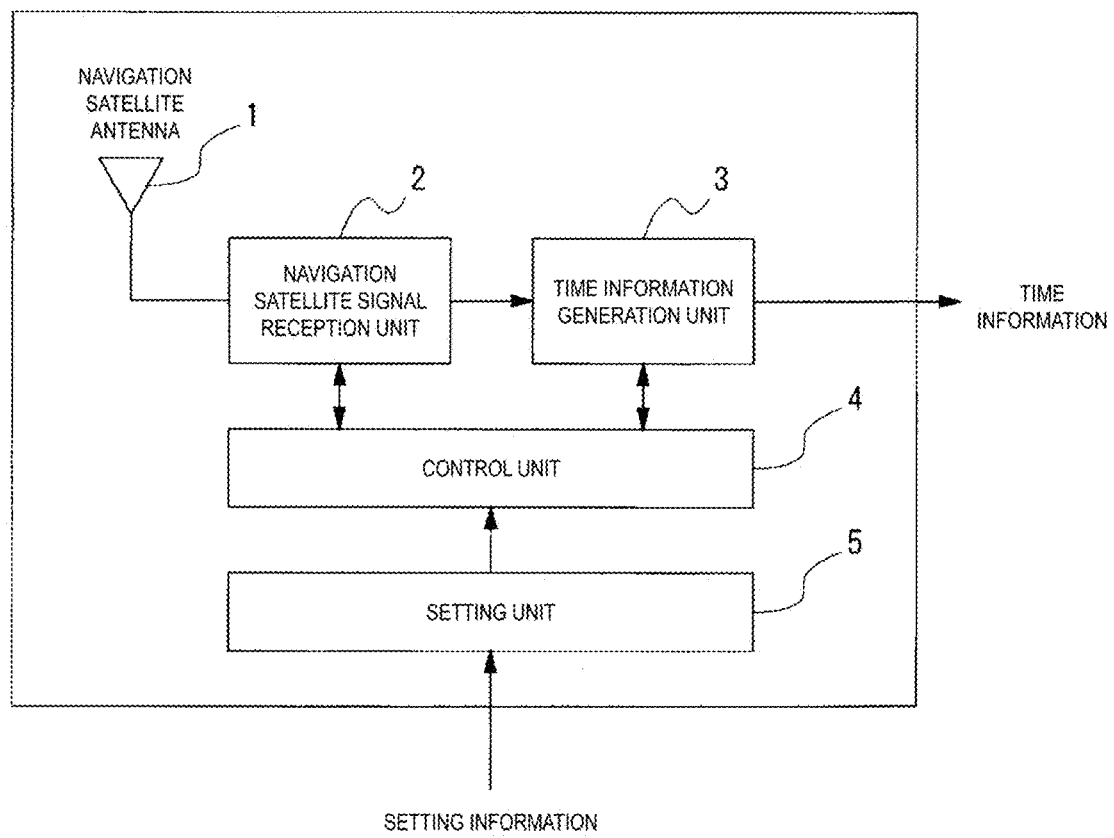
FIG. 1 is a configuration diagram illustrating an example of a time synchronization apparatus.

An overall configuration of a system including a navigation satellite system reception apparatus according to one embodiment of the present disclosure will be illustrated in FIG. 1. In the system, a time synchronization apparatus will be described as an example of the navigation satellite system reception apparatus. The system includes a navigation satellite antenna 1, a navigation satellite signal reception unit 2, a time information generation unit 3, a control unit 4, and a setting unit 5. The time synchronization apparatus may be implemented in any form. The time synchronization apparatus may be implemented by installing a program in a computer, or may be implemented as a dedicated hardware apparatus.

The navigation satellite antenna 1 is an antenna for receiving navigation satellite signals. The navigation satellite signal reception unit 2 is a function unit that receives a plurality of navigation satellite signals, computes time information at a reception position, and outputs the computed results to the time information generation unit 3. The time information generation unit 3 is a function unit that generates time information and outputs the generated time information to the outside. The control unit 4 is a function unit for controlling the navigation satellite signal reception unit and the time information generation unit. The setting unit 5 is a function unit for performing settings of various parameters of the system. A configuration and an operation of each function unit will be described below in detail.

The navigation satellite antenna 1 is connected to the navigation satellite signal reception unit 2 with a coaxial cable or the like, and transmits received navigation satellite signals to the navigation satellite signal reception unit 2.

The navigation satellite signal reception unit 2 performs computation to determine four parameters, i.e., three-dimensional coordinate information (x, y, z) of a reception position of signals by simultaneously receiving signals of at least four navigation satellites and reception time information (t) obtained by correcting time information received from each navigation satellite based on propagation delay time from the position of each navigation satellite to a reception point.

In addition, the navigation satellite signal reception unit 2 corrects transmission delay time of a transmission path such as a coaxial cable between the navigation satellite antenna 1 and the navigation satellite signal reception unit 2, and generates time information at an installation position of the navigation satellite antenna 1.

The navigation satellite signal reception unit 2 outputs time information in synchronization with the navigation satellites generated as described above and information related to used navigation satellites to the time information generation unit 3 and the control unit 4. In one example, as the time information, timecode data in a format of NMEA 0183 or the like for reporting timing signals in a signal format of Pulse Per Second (I PPS) or the like in synchronization with navigation satellite signals and information (Time of the Day (ToD)) related to absolute time such as hour and second is used. As the information related to a navigation satellite, a type of a navigation satellite system, a satellite number, an azimuth, an angle of elevation, a CNR, or the like in a format of NMEA 0183 or the like is used. In contrast, selection of navigation satellite signals to be used for positioning and time synchronization in the navigation satellite signal reception unit 2 is based on a command of the control unit 4.

The navigation satellite signal reception unit 2 may be installed inside the apparatus, or may use a navigation satellite signal reception apparatus installed outside the apparatus. The navigation satellite signal reception unit 2 can store reception position information computed through positioning using navigation satellite signals. In that case, on the condition that the position of the navigation satellite antenna 1 is not moved, time synchronization can be continuously performed afterwards as long as navigation satellite signals from at least one satellite are received. Note that continuously performing time synchronization by using stored reception position information and navigation satellite signals of at least one satellite is hereinafter referred to as a "position fixed mode".

The time information generation unit 3 is a function unit having a function of generating time information in synchronization with navigation satellite signals. The time information generation unit 3 generates time according to a predetermined standard, which in this case is time signals in synchronization with UTC described above, based on time information supplied from the navigation satellite signal reception unit 2. Specifically, the time information generation unit 3 internally includes a reference frequency oscillator and a phase synchronization circuit (Phase Locked Loop (PLL)). The time information generation unit 3 subordinately synchronizes timing with 1 PPS signals supplied from the navigation satellite signal reception unit 2, and at the same time, generates time information in coordination with absolute time according to ToD information supplied from the navigation satellite signal reception unit 2. When signals from the navigation satellite signal reception unit 2 stop, the time information generation unit 3 can maintain and continue generation of time information by free running (holdover) of the reference frequency oscillator.

The time information generation unit 3 has a function of supplying time information to an apparatus (apparatus as a target of time synchronization) outside the apparatus performing time synchronization. As the time information used in this case, it is also assumed that time information is supplied via packet communication interface such as Ethernet (trade name) by using the Precision Time Protocol (PTP) defined in Institute of Electrical and Electronics Engineers (IEEE) 1588 version 2, other than 1 PPS/ToD described above.

The control unit 4 performs processing of controlling the navigation satellite signal reception unit 2 and the time information generation unit 3, comparing time information output from the navigation satellite signal reception unit 2, and extracting navigation satellites, for example, in order to implement algorithm for generating time information to be described below, based on information of parameters input to the setting unit 5.

The setting unit 5 performs settings of various parameters necessary for the operation of the system from the outside. The parameters to be set include, for example, settings of correction values for transmission delay time occurring in a transmission path such as a coaxial cable for connecting the navigation satellite antenna 1 and the navigation satellite signal reception unit 2, a type of navigation satellite signals to be used, a time zone of a navigation satellite signal reception position, and parameters used for implementing algorithm for generating positioning information and time information to be described below.

The present disclosure relates to, when invisible satellite signals are received as multipath signals (reflected waves or diffracted waves) without direct waves, a navigation satellite system reception apparatus that generates highly accurate time information having small errors with respect to time of a navigation satellite system and highly accurate position information. Operation algorithm therefor will be described below.

First, as a precondition, it is assumed that signals of four or more navigation satellites, whether the signals are visible satellite signals (direct wave signals or multipath signals with direct waves) or invisible satellite signals (multipath signals without direct waves), can be received in an environment in which a structure blocking propagation of navigation satellite signals is present near the navigation satellite antenna 1. It is also assumed that whether the received navigation satellite signals are visible satellite signals or invisible satellite signals are unknown.

Under the precondition described above, the procedures described below are followed so that navigation satellites to be used for positioning and time synchronization are selected based on the received navigation satellite signals, with the aim of enhancing positioning and time accuracy. To enhance positioning accuracy herein refers to reducing a difference between true values of coordinates of a reception position of a navigation satellite signal using the navigation satellite antenna 1 and coordinates of positioning results. To enhance time accuracy herein refers to reducing a difference from time generated based on visible satellite signals received in an open sky environment at a reception position of navigation satellite signals using the navigation satellite antenna 1. The control unit 4 performs control of the navigation satellite signal reception unit 2 and the time information generation unit 3, based on set values of parameters set in the setting unit 5 in order to perform generation of time information according to the procedures.

The procedures include Procedure (A) initial coordinate value determination procedure and Procedure (B) satellite selection and time synchronization procedure described below. Procedure (A) is a procedure from start of reception of navigation satellite signals to determination of an initial coordinate value, and Procedure (B) is a procedure of selecting navigation satellite signals and performing positioning and time synchronization. In the processing of Procedures (A) and (B), estimation of a reception position of the time synchronization apparatus is performed, and the processing is thus referred to as a "position estimation mode".

Procedure (A)

(I) Out of n navigation satellite signals received through predetermined reception time set in the setting unit 5 in advance after start-up of the time synchronization apparatus, navigation satellite signals with Signal-to-Noise Ratio (SNR) exceeding a threshold of an SNR set in the setting unit 5 in advance are selected. Here, a CNR can be used as one index of the SNR. When the number of selected satellites is less than four, navigation satellite signals are selected in a descending order from a satellite having the highest CNR in addition to the selected satellites so that a total number of satellites reaches four. Here, the reception time is set so that the time synchronization apparatus captures navigation satellite signals and captures orbit information of a satellite based on navigation satellite signals, specifically, position information of a navigation satellite. In a case of using the GPS, the satellite orbit information includes two types of orbit data, i.e., Almanac data being overall orbit data of all of operating GPS satellites and Ephemeris data being precise orbit data of each satellite. Although each piece of such data can be acquired from navigation messages included in navigation satellite signals, acquiring almanac data requires 12 minutes and 30 seconds. However, navigation satellite signals having a high CNR are received promptly after start-up in an operation referred to as random search, and orbit data of the satellite can be acquired as Ephemeris data from navigation messages from the satellite. Thus, even if the reception time is set to time shorter than time required for acquiring Almanac data, it does not necessarily cause a problem in operation. In addition to the method of acquiring from navigation messages, examples of methods of acquiring the satellite orbit information include a method of acquiring satellite orbit information by using a Secure User Plane Location (SUPL) server via a mobile network by means of Assisted GNSS and a method of acquiring orbit information available on the Internet. One example of a website that shows orbit information of navigation satellites is given below: URL: http://sys.qzss.go.jp/dod/archives/pnt.html (II) Positioning is performed by using navigation satellite signals selected in (I) described above, and results of the positioning are used as an initial coordinate value.

Procedure (B)

(I) Based on the initial coordinate value calculated in Procedure (A), arrival times to the position of the initial coordinate value are calculated based on positions of the n received navigation satellites and time of the navigation satellite signals.

(II) Of the n arrival times calculated in (I) described above, the earliest time $T_0$ is determined.

(III) Next, using a tolerable error value $dT_1$ set in the setting unit 5 in advance, a reference time of $T_0+dT_1$ is set.

(IV) Of the n arrival times calculated in (I) described above, navigation satellite signals earlier than $T_0+dT_1$ are extracted.

(V) If the number of navigation satellite signals extracted in (IV) described above is four or more, positioning is performed by using the extracted navigation satellite signals, and the initial coordinate value of (I) described above is updated.

(VI) (I) to (V) described above is repeatedly performed for a coordinate value update period set in the setting unit 5 in advance. Specifically, recursive processing with position information being used as parameters and an end condition being processing time is performed.

(VII) Positioning and time synchronization is performed by using the navigation satellite signals extracted in (VI) described above, and obtained time information is used as time information generated based on the received navigation satellite signals.

In the present disclosure, Procedures (B') and (B") described below may be performed instead of Procedure (B) described above. Procedures (B') and (B") will be described below in detail.

Procedure (B')

(I) Based on the initial coordinate value calculated in Procedure (A), arrival times to the position of the initial coordinate value are calculated based on positions of the n received navigation satellites and time of the navigation satellite signals.

(II) For each of nCm combinations of m out of n received navigation satellites (note that n>m), an average value of the arrival times to the position of the initial coordinate value calculated in (I) described above is calculated.

(III) Of the nCm average values of the arrival times calculated in (II) described above, the earliest time $T_0$ is determined.

(IV) Next, using a tolerable error value $dT_2$ set in the setting unit 5 in advance, a reference time of $T_0+dT_2$ is set.

(V) Of the n arrival times calculated in (I) described above, navigation satellite signals earlier than $T_0+dT_2$ are extracted.

(VI) If the number of navigation satellite signals extracted in (V) described above is four or more, positioning is performed by using the extracted navigation satellite signals, and the initial coordinate value of (I) described above is updated.

(VII) (I) to (VI) described above is repeatedly performed for a coordinate value update period set in the setting unit 5 in advance. Specifically, recursive processing with position information being used as parameters and an end condition being processing time is performed.

(VIII) Positioning and time synchronization is performed by using the navigation satellite signals extracted in (VII) described above, and obtained time information is used as time information generated based on the received navigation satellite signals.

Procedure (B")

(I) Based on the initial coordinate value calculated in Procedure (A), arrival times to the position of the initial coordinate value are calculated based on positions of the n received navigation satellites and time of the navigation satellite signals.

(II) For each of nCm combinations of m out of n received navigation satellites (note that n>m), an average value of the arrival times to the position of the initial coordinate value calculated in (I) described above is calculated.

(III) Of the nCm average values of the arrival times calculated in (11) described above, the earliest time $T_0$ is determined.

(IV) Next, using a tolerable error value $dT_2$ set in the setting unit 5 in advance, a reference time of $T_0+dT_3$ is set.

(V) Of the average values of the arrival times in nCm combinations calculated in (II) described above, navigation satellite signals included in combinations earlier than $T_0+dT_2$ are extracted.

(VI) Positioning is performed by using the navigation satellite signals extracted in (V) described above, and the initial coordinate value of (I) described above is updated.

(VII) (I) to (VI) described above is repeatedly performed for a coordinate value update period set in the setting unit 5 in advance. Specifically, recursive processing with position information being used as parameters and an end condition being processing time is performed.

(VIII) Positioning and time synchronization is performed by using the navigation satellite signals extracted in (VII) described above, and obtained time information is used as time information generated based on the received navigation satellite signals.

Note that the above tolerable error value dT ($dT_1$ of Procedure (B), $dT_2$ of Procedure (B'), and $dT_3$ of Procedure (B")) is a parameter set in the setting unit 5. Here, it should be noted that 0 may be set as the tolerable error value dT. A method of determining the tolerable error value dT will be described below.

The reason why time synchronization accuracy is improved in each case regarding the number of received visible satellite signals in each procedure will be described below.

It is highly probable that a satellite associated with a navigation satellite signal having received strength or a threshold of a CNR exceeding a predetermined threshold is a visible satellite. If a navigation satellite signal is received with a CNR being 40 dB-Hz or higher, it is likely that the navigation satellite signal is a visible satellite signal. In view of this, in Procedure (A), it is preferable that a value of 40 dB-Hz is used as a CNR threshold. If the number of satellites having a CNR value exceeding the CNR threshold is less than four, navigation satellite signals are selected in descending order from a satellite having the highest CNR so that the number reaches four. It is expected that the navigation satellite signals selected in Procedure (A) as described above include many visible satellite signals. As a result, it is expected that errors of the initial coordinate value calculated in Procedure (A) are smaller than errors of a coordinate value calculated by using all of the received navigation satellite signals.

Next, in Procedure (B), navigation satellite signals with early arrival time are selected for the initial coordinate value calculated in Procedure (A). It is highly probable that the navigation satellite signals selected in this manner are from visible satellites or invisible satellites with small propagation delay. If the number of the selected navigation satellite signals is four or more, it is expected that positioning arithmetic operation is performed so that errors of the initial coordinate value are reduced for updating the initial coordinate value calculated in Procedure (A). By repeatedly performing (I) to (V) for a coordinate value update period set in advance in Procedure (B), errors of the initial coordinate value are more gradually reduced, and it is expected to increase probability that the navigation satellite signals selected based on this are from visible satellites or invisible satellites with small propagation delay.

In Procedure (B), time $T_0$ that is the earliest in n arrival times is determined based on the initial coordinate value calculated in Procedure (A). In Procedure (B') and Procedure (B"), by contrast, time $T_0$ is calculated based on time that is the earliest in nCm average values of arrival times based on the initial coordinate value calculated in Procedure (A). In Procedure (B), unexpected measurement errors may occur in $T_0$. In Procedure (B') and Procedure (B"); however, $T_0$ is calculated based on arrival times of a plurality of navigation satellite signals, and thus influence of variation in measurement or the like can be eliminated.

Next, a method of determining the tolerable error value dT will be described in detail.

An optimal value of a set value of the tolerable error value dT differs depending on a reception state of navigation satellite signals. In an open sky reception environment, a large number of visible satellite signals are received. In that case, receiving as many navigation satellite signals located all over the sky in a distributed manner as possible is effective in reducing a DOP value and enhancing accuracy. To this end, a relatively large value needs to be set as a value of the tolerable error value dT, and as many visible satellite signals as possible need to be selected. The arrival time of a visible satellite signal has a small delay from the reference time $T_0$, and thus it is conceivable that all the visible satellite signals can be selected if a value around 20 ns is set as the tolerable error value dT. At the same time, when the value of the tolerable error value dT is 0 or less than 20 ns, not all the visible satellite signals may not be selected.

In contrast, in a multipath reception environment in which the number of visible satellite signals is four or less, when the tolerable error value dT is 0, it is expected that a navigation satellite signal with the highest accuracy including a visible satellite signal is selected. However, when many invisible satellite signals are selected along with an increase of the value of the tolerable error value dT, positioning and time synchronization accuracy may be deteriorated. In other words, it is desirable that the value of the tolerable error value dT be small.

Figure 2:
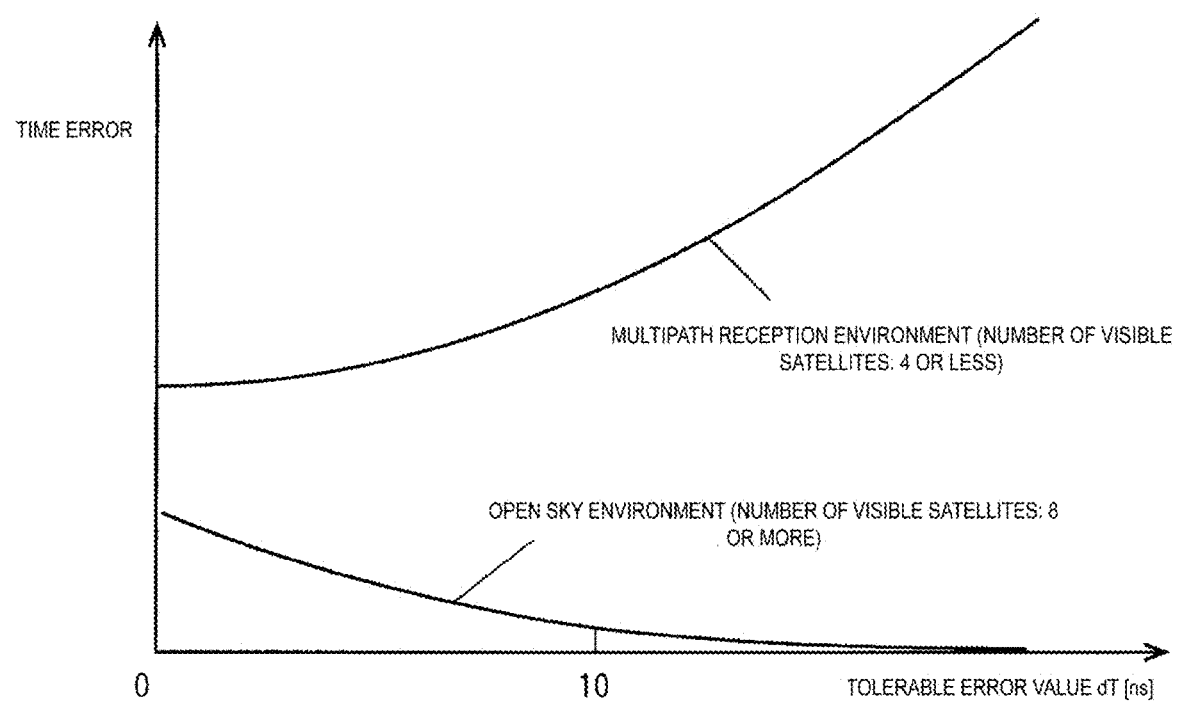
FIG. 2 is a graph showing a relationship between a tolerable error value and time synchronization accuracy.

FIG. 2 is a schematic diagram illustrating a relationship between a set value of the tolerable error value dT and time synchronization accuracy. FIG. 2 shows the following: In an open sky reception environment, time errors being deviation from a true value of time is reduced as the set value of the tolerable error value dT is large. In a multipath reception environment, by contrast, such time errors are increased as the set value of the tolerable error value dT is large. Note that, in FIG. 2, a case in which the number of visible satellites is eight or more is regarded as an "open sky reception environment", and a case in which the number of visible satellites is four or less is regarded as a "multipath reception environment".

Figure 3:
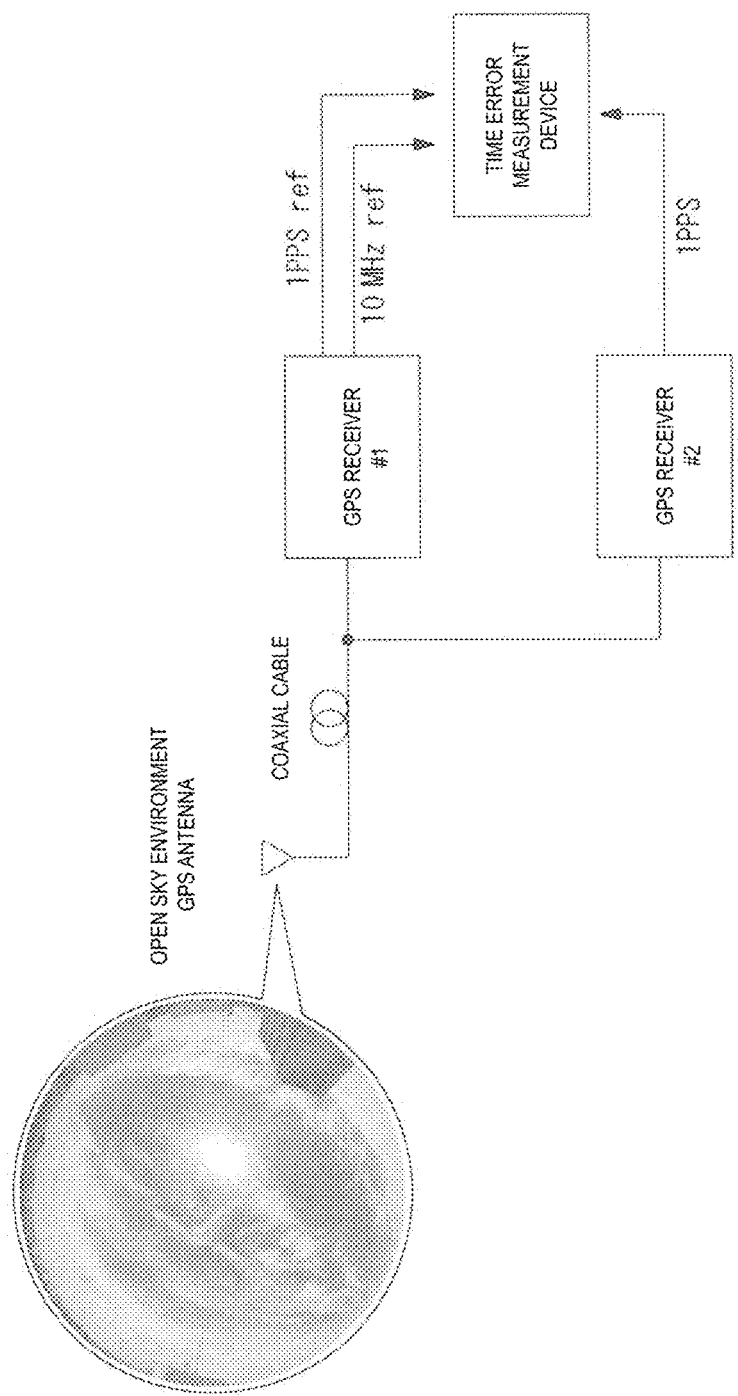
FIG. 3 is a configuration diagram illustrating a measurement system of time accuracy in an open sky reception environment.

Evaluation results for a case in which the tolerable error value dT is fixed by using the time synchronization apparatus according to the embodiment described above are illustrated. FIG. 3 illustrates a configuration of an experimental system used to measure time errors occurring due to the set value of the tolerable error value dT in an open sky environment. GPS receiver #1 that generates base signals (1 PPS signals and 10 MHz clock signals) being reference signals does not perform satellite selection. In contrast, GPS receiver #2 uses Procedure (B') according to the embodiment described above, sets m to 4, and performs satellite selection according to the setting of the tolerable error value dT ($dT_2$). An evaluation index is a value of measured time errors.

Figure 4:
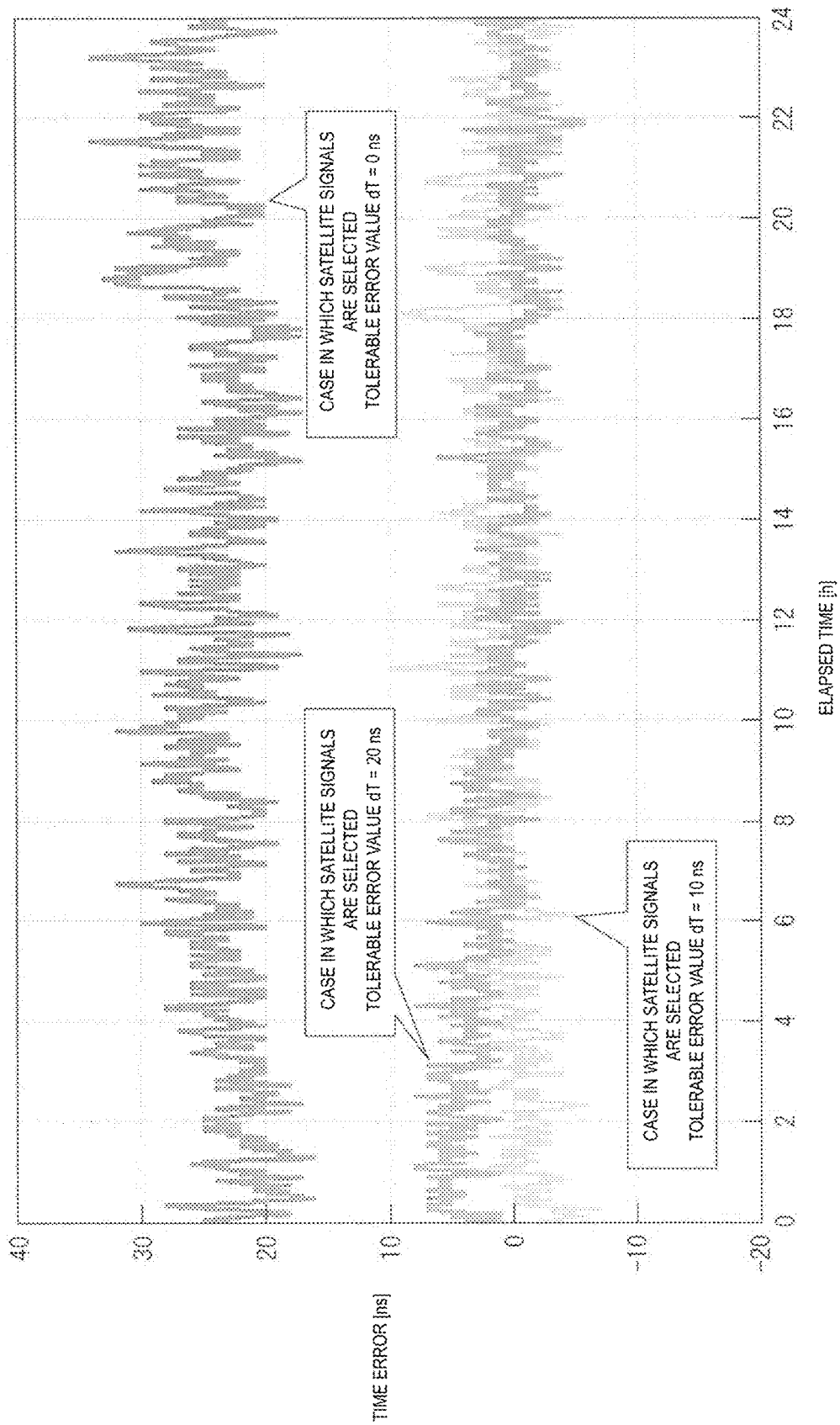
FIG. 4 shows measurement results of time accuracy with respect to a tolerable error value in an open sky reception environment.
Figure 5:
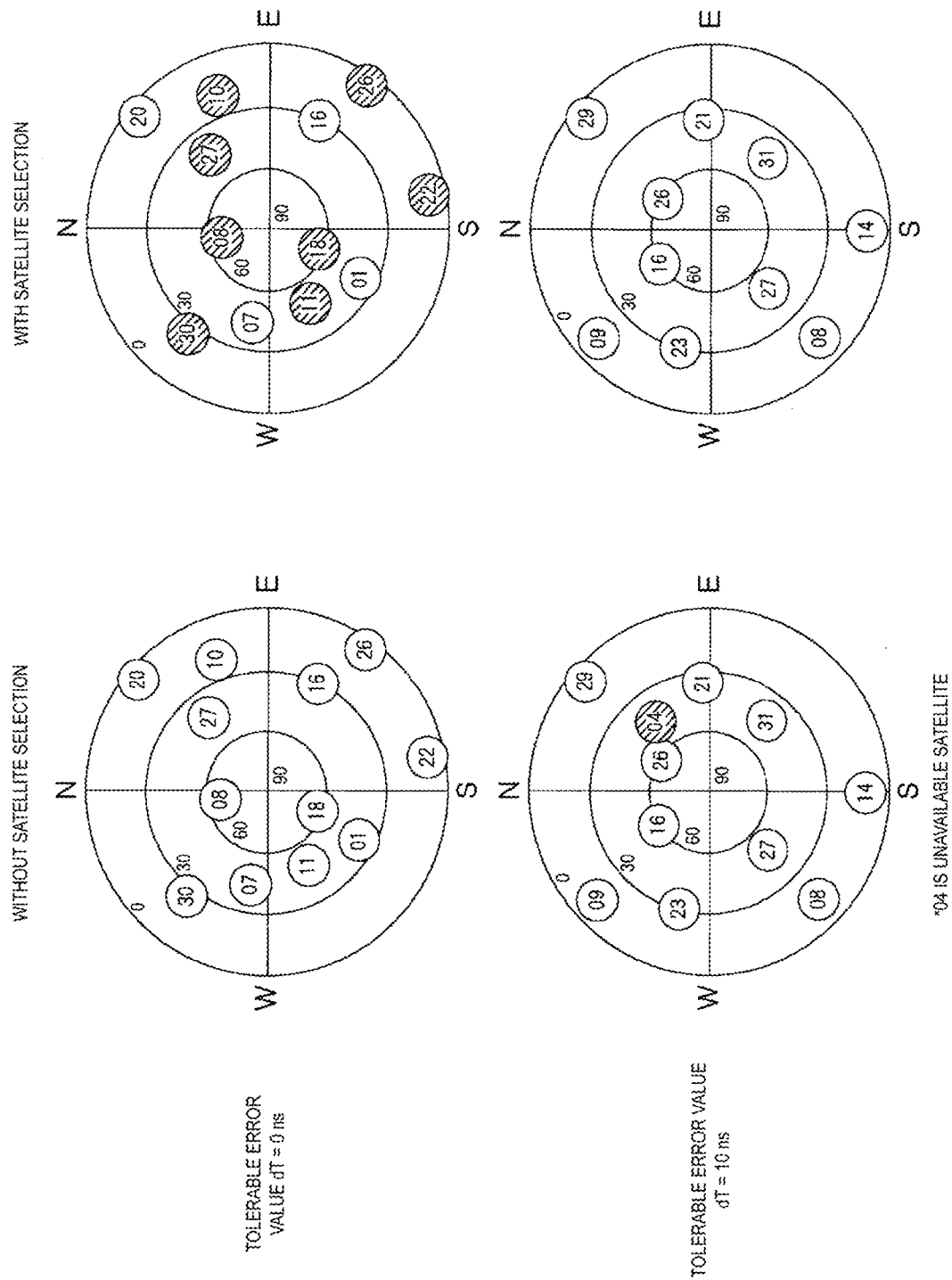
FIG. 5 illustrates a state of used GPS satellite signals with respect to a tolerable error value in an open sky reception environment.

FIG. 4 shows, in an open sky environment, measurement results of time errors when navigation satellite signals are selected with the value of the tolerable error value dT being set to 0 ns, 10 ns, and 20 ns. FIG. 5 is a part of a screenshot of software that observes a state of navigation satellite signals received and used (selected) in a certain epoch (time) when, in an open sky environment, the value of the tolerable error value dT is set to 0 ns and 10 ns. In FIG. 5, hatching in circles representing navigation satellites denotes that navigation satellite signals from the navigation satellites are received but are not used (selected).

As illustrated in FIG. 4, when the value of the tolerable error value dT is set to 0 ns, time errors are increased by approximately 30 ns in comparison with a case in which the value of the tolerable error value dT is set to 10 ns and 20 ns. As illustrated in FIG. 5, when the value of the tolerable error value dT is set to 0 ns, four satellites are used, whereas when the value of the tolerable error value dT is set to 10 ns, the same satellites as those when satellite selection is not performed are used. In other words, in an open sky reception environment, when the value of dT is set to 10 ns, more visible satellite signals are selected. As a result, it is confirmed that the DOP value is reduced, and time synchronization accuracy is improved.

Figure 6:
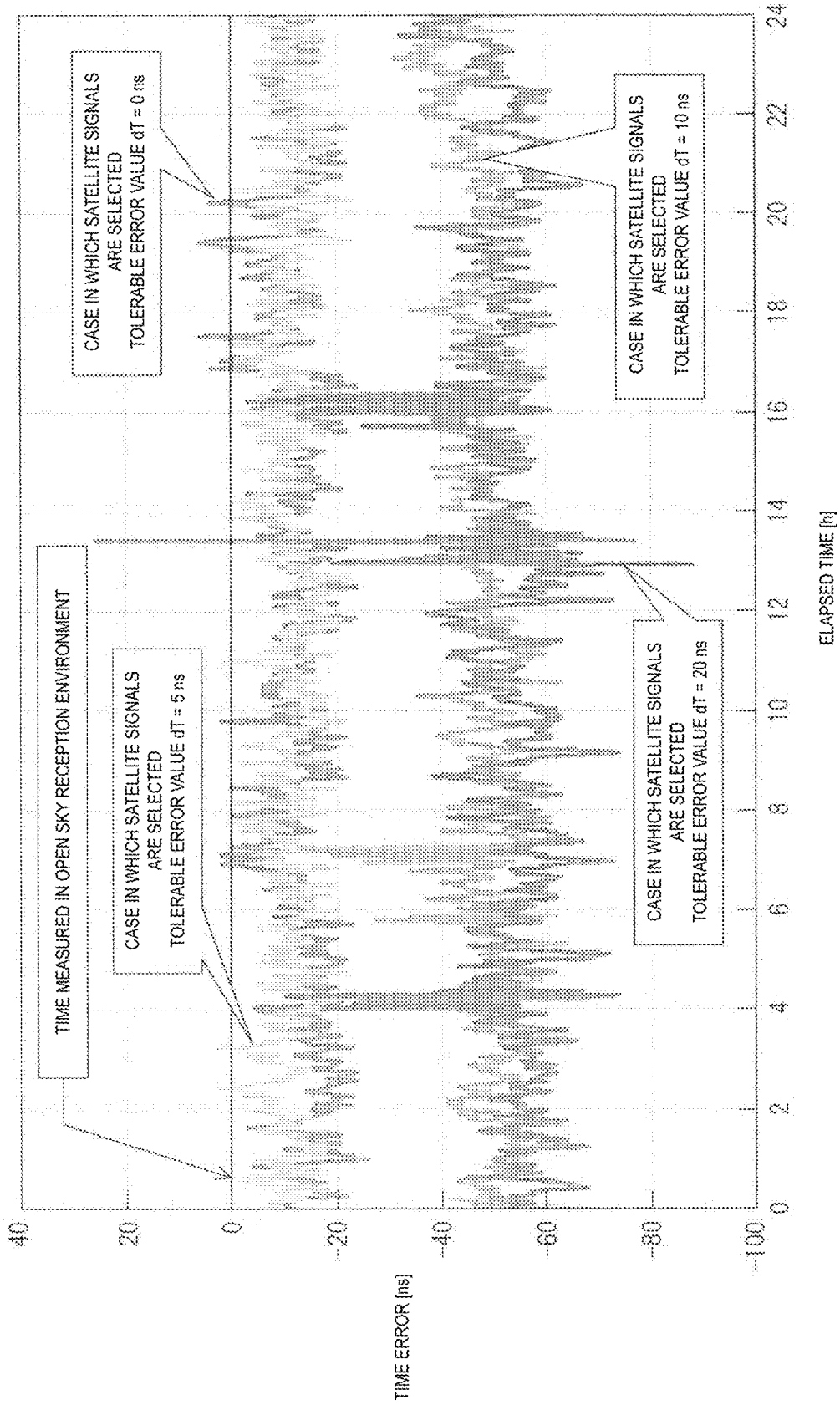
FIG. 6 shows measurement results of time accuracy with respect to a tolerable error value in a multipath reception environment.
Figure 14:
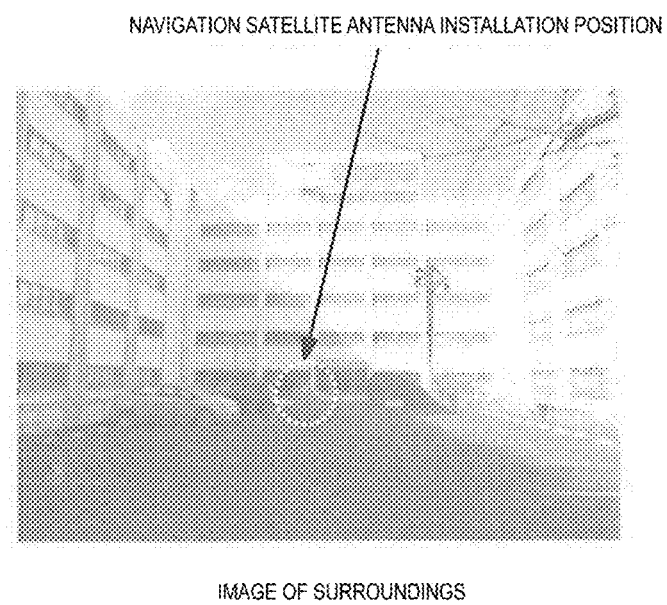
FIG. 14 is a diagram for describing an environment in which multipath signals are received.
Figure 15:
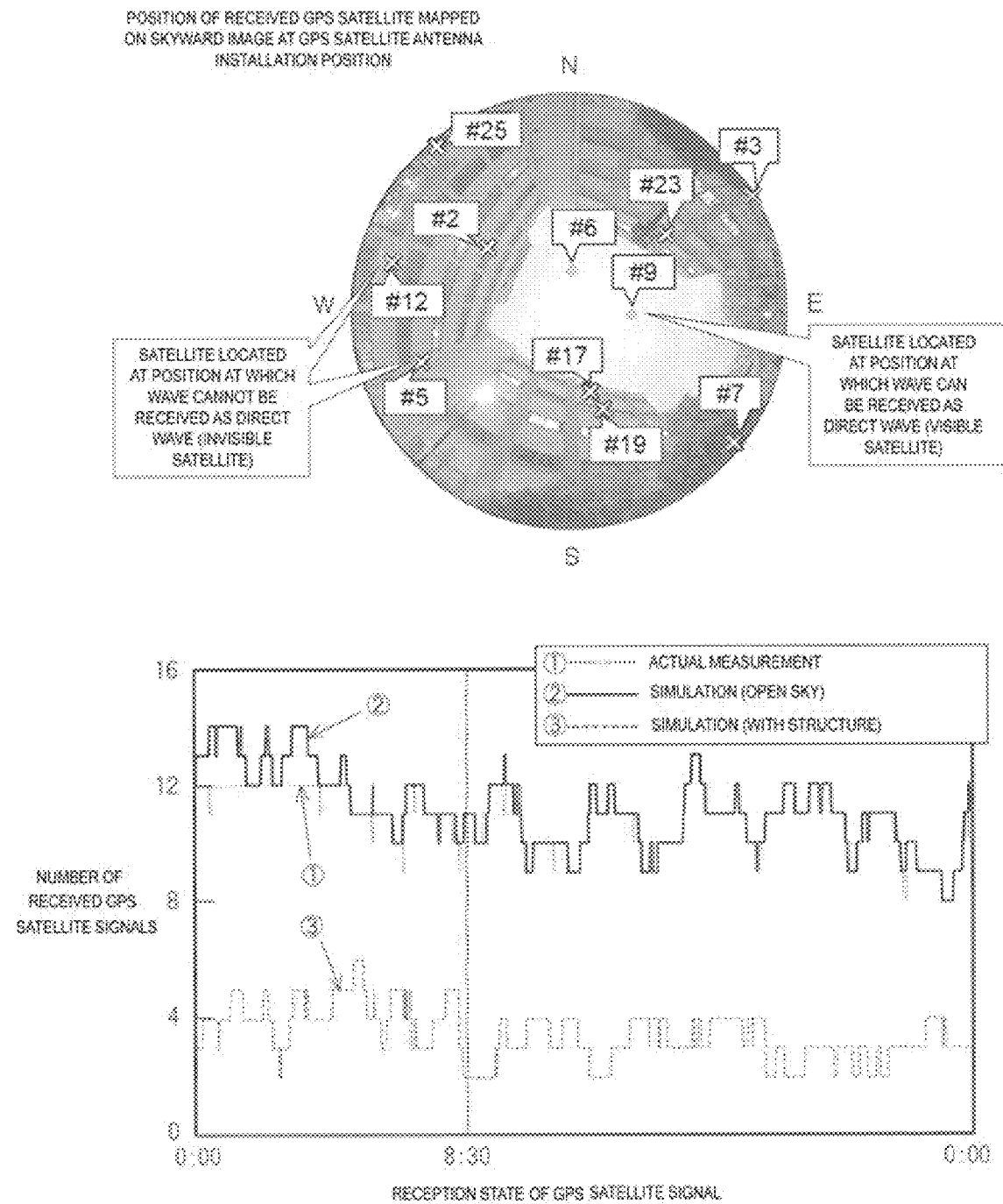
FIG. 15 is a diagram for describing a reception state of multipath signals.
Figure 16:
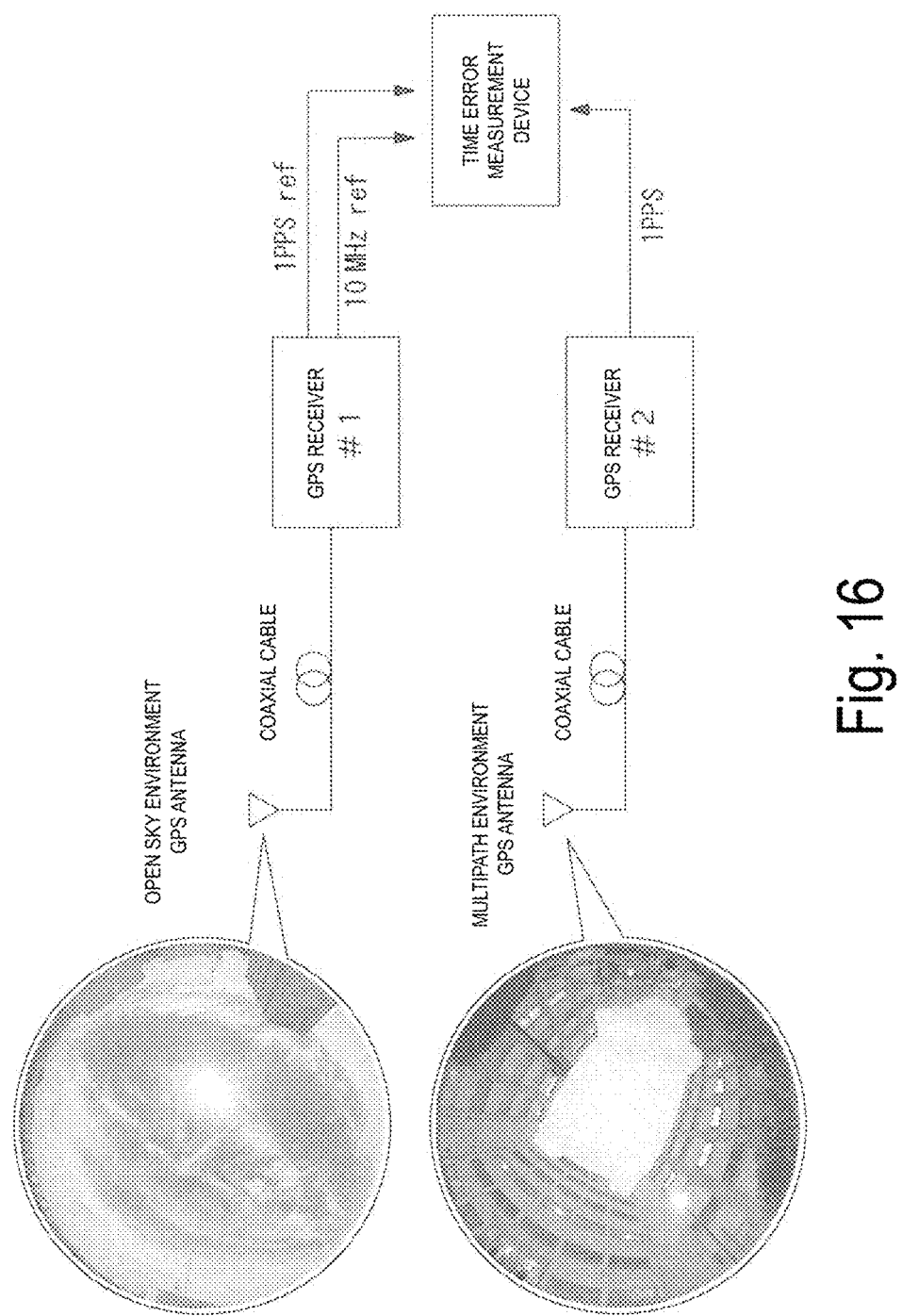
FIG. 16 is a configuration diagram illustrating a measurement system of time accuracy in a multipath reception environment.

FIG. 6 shows results of measurement of time errors by using the measurement system of FIG. 16 in a multipath reception environment illustrated in FIGS. 14 and 15. Procedure (B') is used, and m is set to 4. When the value of the tolerable error value dT ($dT_2$) is set to 20 ns, a maximum value of time errors reaches approximately 60 ns. In contrast, when the value of the tolerable error value dT is set to 0 ns and 5 ns, it is confirmed that a maximum value of time errors is reduced to approximately 20 ns.

Figure 7:
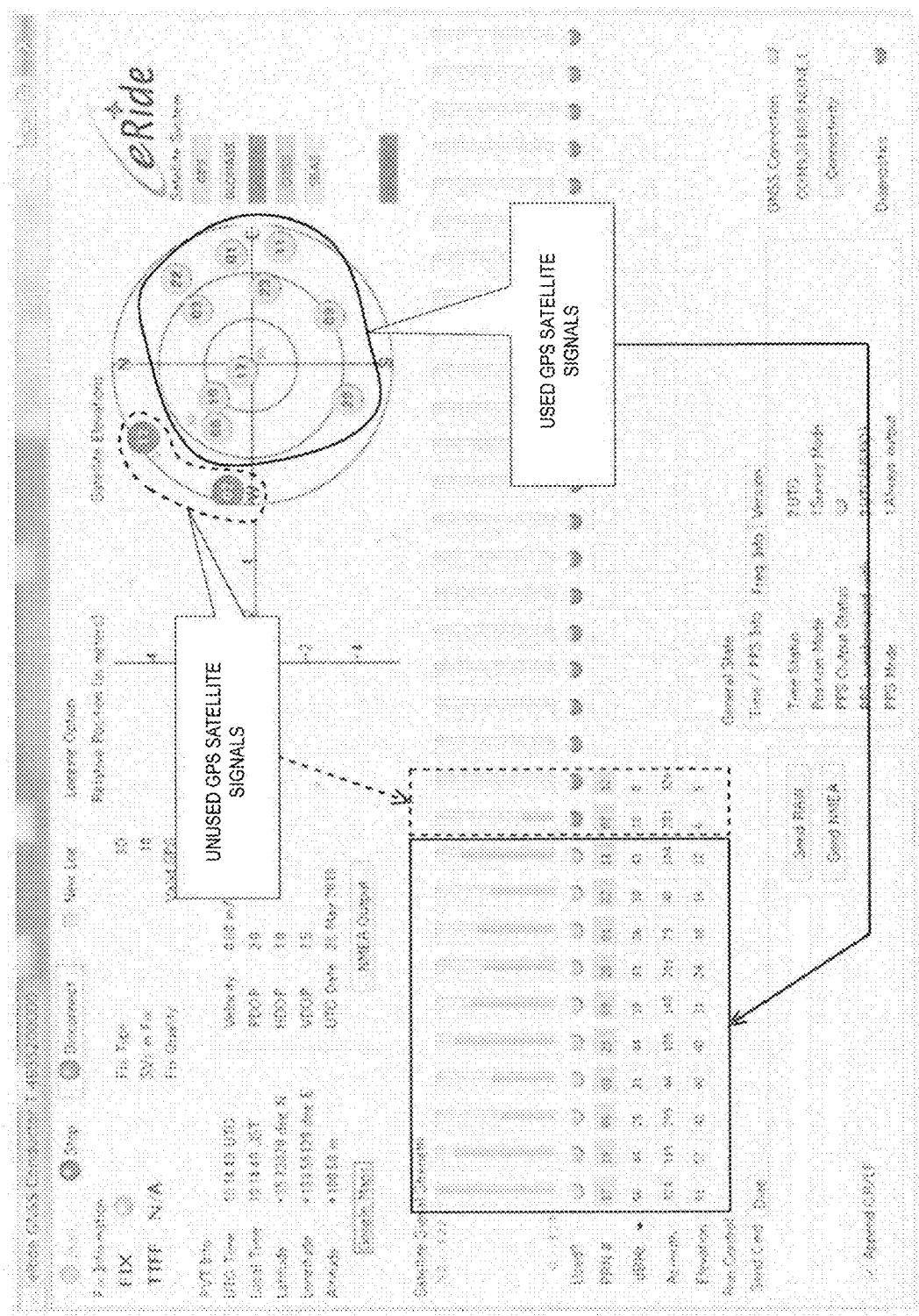
FIG. 7 illustrates a state of GPS satellite signals used without satellite selection algorithm being applied in a multipath reception environment.
Figure 8:
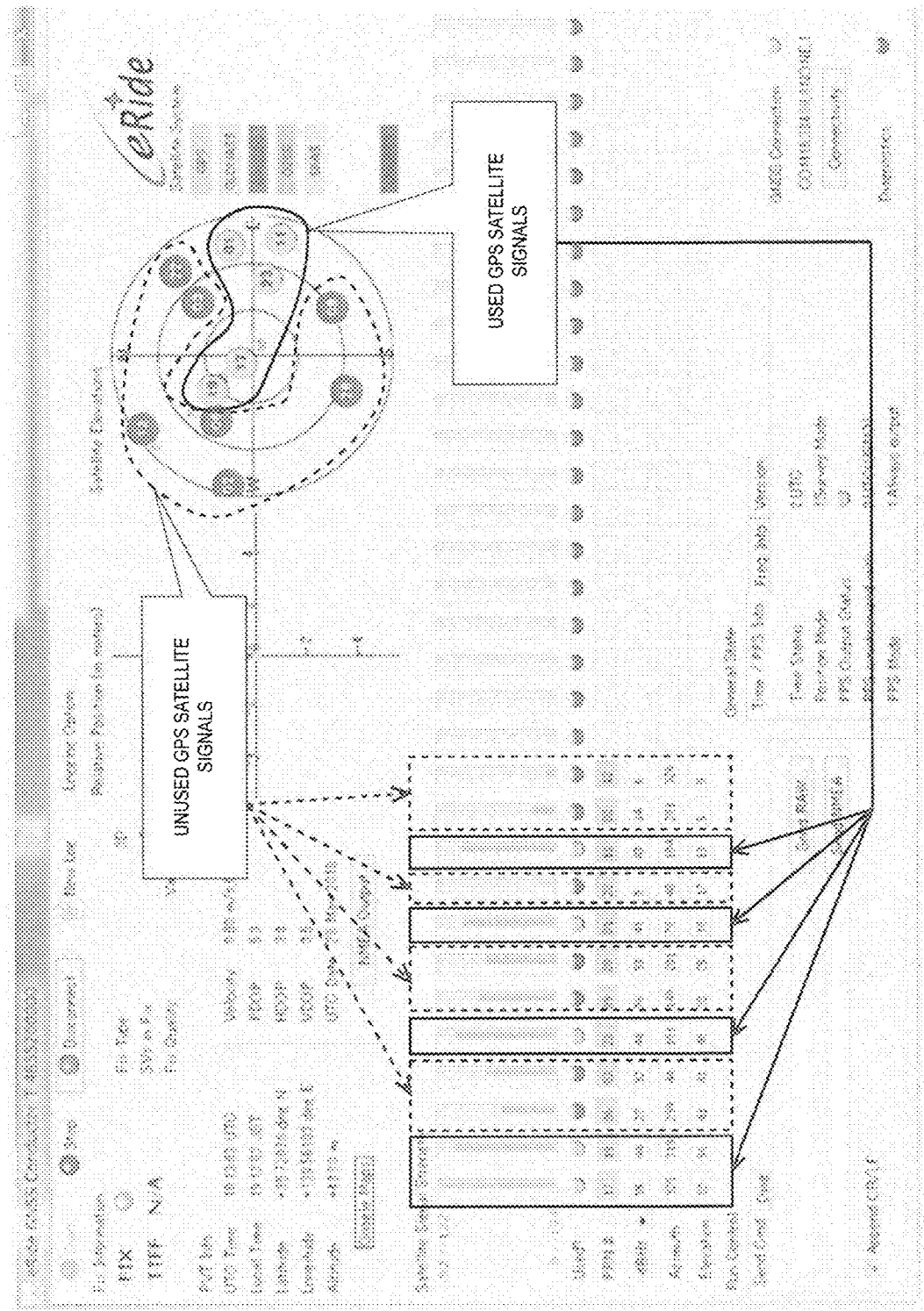
FIG. 8 illustrates a state of GPS satellite signals used with satellite selection algorithm being applied in a multipath reception environment.

FIGS. 7 and 8 are each a screenshot of software that observes a reception state of navigation satellite signals. FIG. 7 illustrates, as a comparison, an example of a reception state and a use (selection) state of GPS satellite signals of a case in which satellite selection algorithm according to the disclosure of the present application is not used, and FIG. 8 illustrates an example of a reception state and a use (selection) state of GPS satellite signals of a case in which satellite selection algorithm according to the disclosure of the present application is used.

In a case in which satellite selection is not performed as illustrated in FIG. 7, many GPS satellite signals estimated as being invisible satellite signals are selected in addition to GPS satellite signals estimated as being visible satellite signals assigned numbers of 01, 11, 17, 19, and 23. In contrast, in a case in which satellite selection is performed with the value of the tolerable error value dT being set to 5 ns as illustrated in FIG. 8, GPS satellite signals estimated as being visible satellite signals are selected. The time synchronization accuracy is considered to be improved as a result of the effective elimination of invisible satellite signals by the satellite selection algorithm according to the disclosure of the present application.

As the above results show, it is preferable that the tolerable error value dT be determined according to a reception environment of navigation satellite signals. Specifically, it is preferable that the tolerable error value dT be set larger as a reception environment is closer to an open sky environment, and the tolerable error value dT be set smaller as a reception environment is closer to a multipath environment. In other words, it is preferable that the tolerable error value dT be set larger as the number of visible satellites is large, and the tolerable error value dT be set smaller as the number of visible satellites is small.

As an actual reception environment of satellite signals, various reception environments, from an environment of a so-called open sky state in which there are no structures around the navigation satellite antenna to a reception environment in which there are no visible satellite signals, are assumable. As a method of optimizing the set value of the error tolerable value dT according to a reception environment, a method of referring to a reception state (CNR) of navigation satellite signals received in Procedure (A) is considered effective. Specifically, when there are many navigation satellite signals with a high CNR, it is estimated based on the CNR that a reception environment is a reception environment closer to open sky, i.e., it is estimated that the number of visible satellites is large, and the error tolerable value dT is set to a large value. In contrast, when the number of such navigation satellite signals is small, it is estimated that a reception environment is a reception environment closer to a multipath environment, i.e., it is estimated that the number of visible satellites is small, and the error tolerable value dT is set to 0 or a small value.

Specifically, it is conceivable to determine the value of the error tolerable value dT based on the number of navigation satellite signals exceeding a threshold of a CNR set in Procedure (A). It is highly probable that a satellite associated with a navigation satellite signal having a threshold of a CNR exceeding a predetermined threshold is a visible satellite, and thus it is estimated that the number of such navigation satellite signals is the number of visible satellites.

Figure 9:
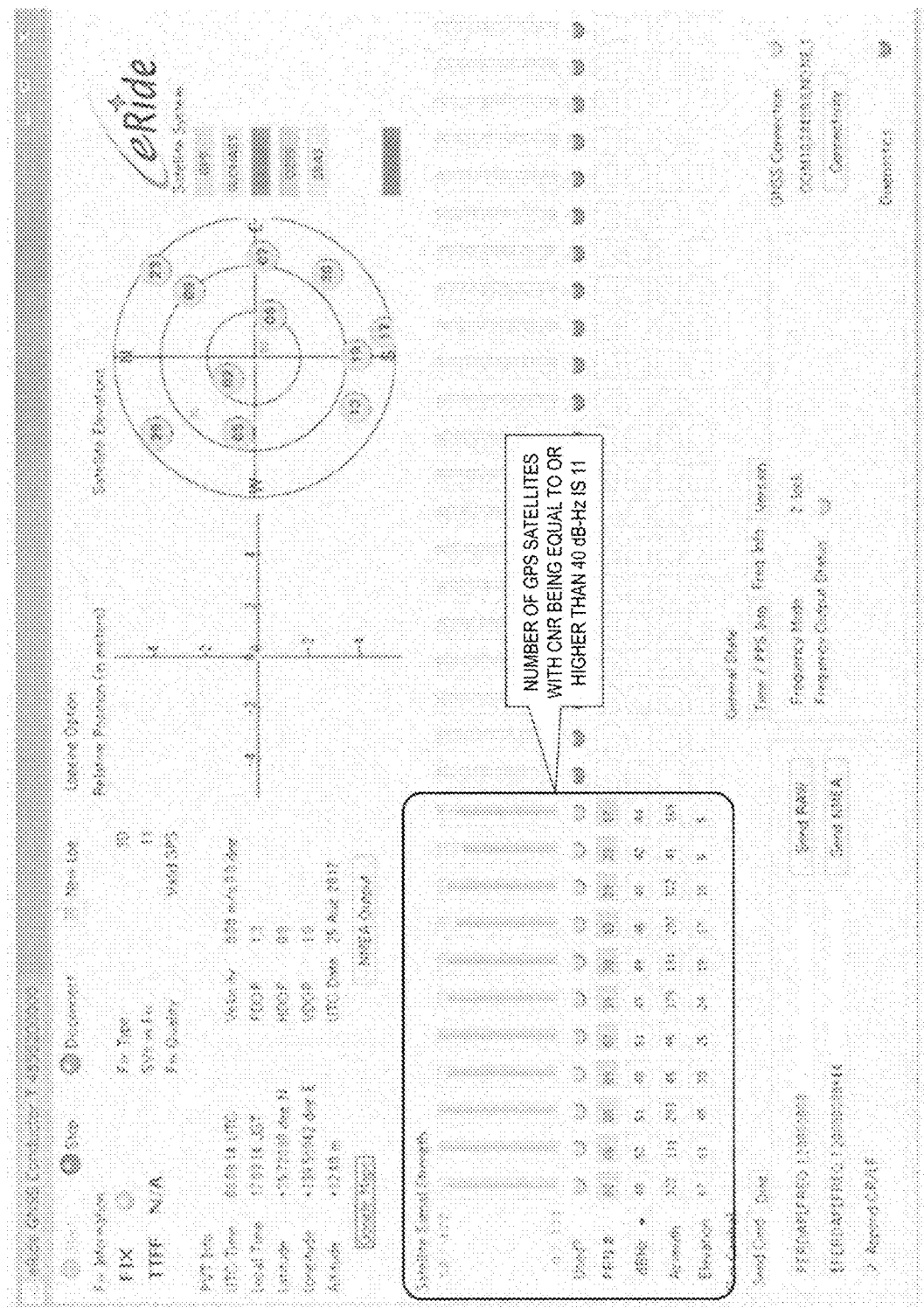
FIG. 9 is a diagram for describing a reception state of GPS satellite signals in an open sky reception environment.
Figure 10:
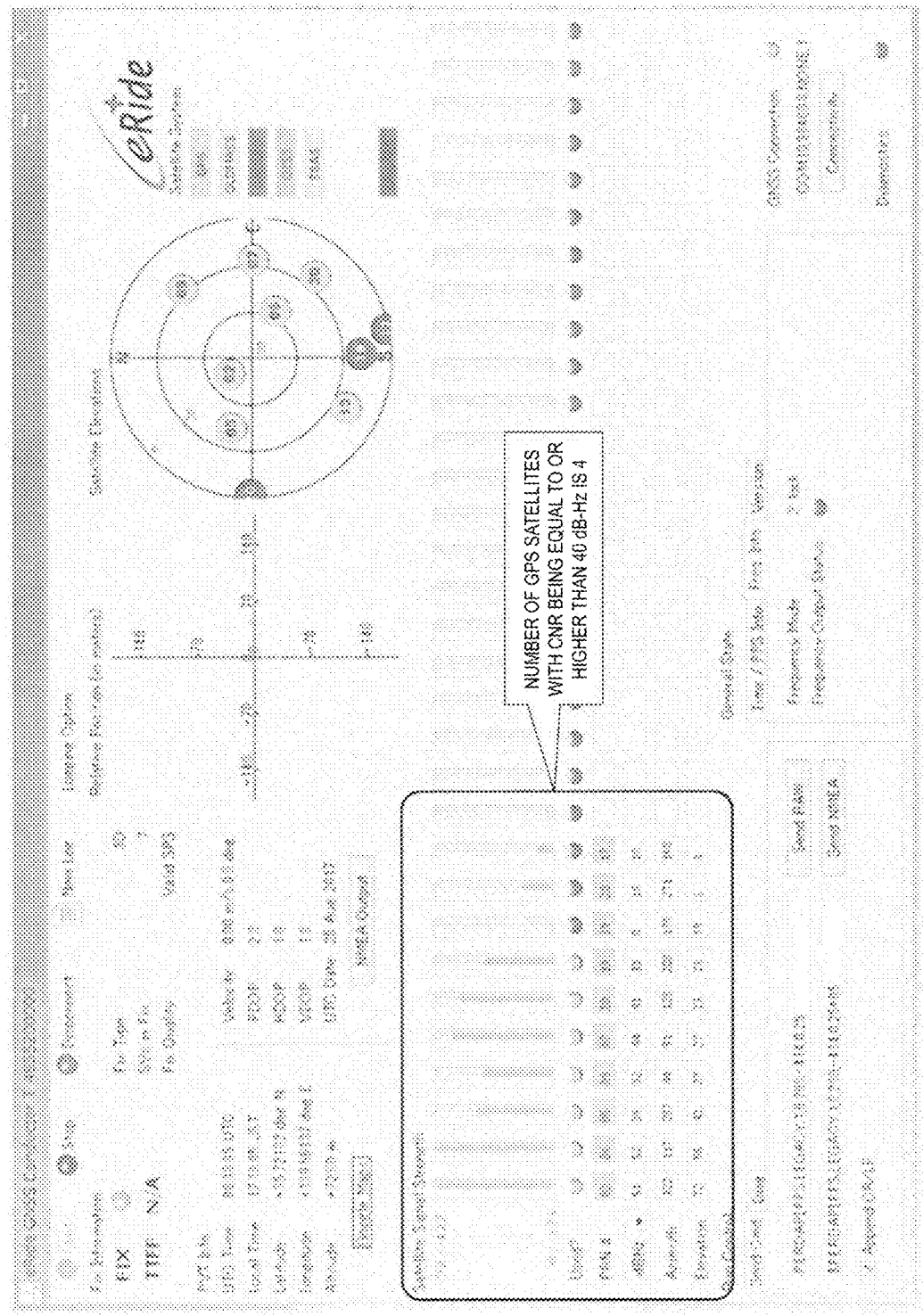
FIG. 10 is a diagram for describing a reception state of GPS satellite signals in a multipath reception environment.
Figure 11:
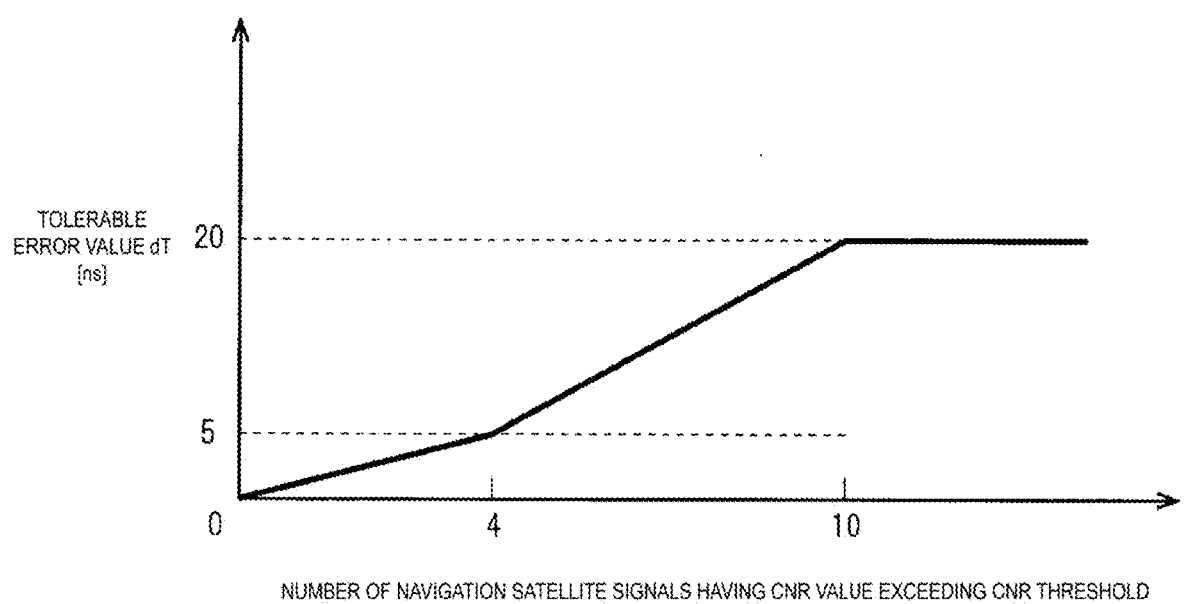
FIG. 11 is a diagram for describing a relationship between the number of navigation satellite signals having a CNR value exceeding a CNR threshold and a tolerable error value.

With reference to FIGS. 9, 10, and 11, a specific example in which a CNR threshold is set in advance and a value of the error tolerable value dT is set based on the number of navigation satellite signals having a CNR value exceeding a CNR threshold will be described.

FIGS. 9 and 10 are each a screenshot of software that observes a reception state of GPS satellite signals for a reception environment. FIG. 9 illustrates an example of a reception state of GPS satellite signals of a case of observation in an open sky reception environment, and FIG. 10 illustrates an example of a reception state of GPS satellite signals of a case of observation in a multipath reception environment. In FIGS. 9 and 10, when a CNR threshold is set to 40 dB-Hz, the number of GPS satellite signals having a CNR value exceeding a CNR threshold is 11 in FIG. 9 and 4 in FIG. 10.

An example in which the tolerable error value dT is set based on a CNR of received navigation satellite signals will be described with reference to FIG. 11. In the specific example of the present embodiment, a function is set such that the tolerable error value dT is increased as the number of navigation satellite signals having a CNR value exceeding a CNR threshold is large. FIG. 11 is a diagram illustrating a function for calculating the tolerable error value dT set for the number of navigation satellite signals having a CNR value exceeding a CNR threshold. In the example of FIG. 11, the tolerable error value dT is set to linearly increase from 0 ns to 5 ns when the number of navigation satellite signals having a CNR value exceeding a CNR threshold is 4 or less, the tolerable error value dT is set to linearly increase from 5 ns to 20 ns when the number of navigation satellite signals having a CNR value exceeding a CNR threshold is between 4 and 10, and the tolerable error value dT is set to 20 ns when the number of navigation satellite signals having a CNR value exceeding a CNR threshold is 10 or more. Note that set examples of FIGS. 9 to 11 are not limited to the above examples. For the CNR threshold, the value of the tolerable error value dT based on a CNR of received navigation satellite signals, a constant (4 and 10) for the number of signals exceeding a CNR threshold in the function of FIG. 11, and a function for calculating the tolerable error value dT set for the number of navigation satellite signals having a CNR value exceeding a CNR threshold, an appropriate value or an appropriate function expression can be set in advance based on an experiment or the like. Note that as an index used to estimate a reception environment, specifically, an index used to estimate the number of visible satellites, an SNR itself or another index representing a reception state of a navigation satellite signal such as received strength can be used as well as a CNR being one index of the SNR.

The role of each function unit when performing the above procedures is as follows.

The navigation satellite signal reception unit 2 performs positioning and time synchronization by using specified navigation satellite signals out of received navigation satellite signals based on a command from the control unit 4, and outputs the resulting time information and information related to navigation satellite signals to the time information generation unit 3 and the control unit 4. The time information generation unit 3 generates and outputs time information, based on the time information and the information related to navigation satellite signals output from the navigation satellite signal reception unit 2 and parameter values input from the control unit 4. The control unit 4 creates a table of combinations of the navigation satellite signals, based on the information of the received navigation satellite signals output from the navigation satellite signal reception unit 2 and setting information of parameters input to the setting unit 5, and commands the navigation satellite signal reception unit 2 to perform positioning and time synchronization. The control unit 4 further compares pieces of time information obtained from the navigation satellite signal reception unit 2 for respective combinations of navigation satellite signals and extracts navigation satellites, and finally commands the navigation satellite signal reception unit 2 to specify navigation satellites and perform positioning and time synchronization for obtaining time information to be output to the time information generation unit 3. In the extraction processing, a tolerable error value dT calculated based on received strength or a CNR of navigation satellite signals received in the navigation satellite signal reception unit 2 and setting information such as a threshold input to the setting unit 5 is used. The control unit 4 outputs the setting information of parameters input to the setting unit 5 to the navigation satellite signal reception unit 2 and the time information generation unit 3.

Figure 17:
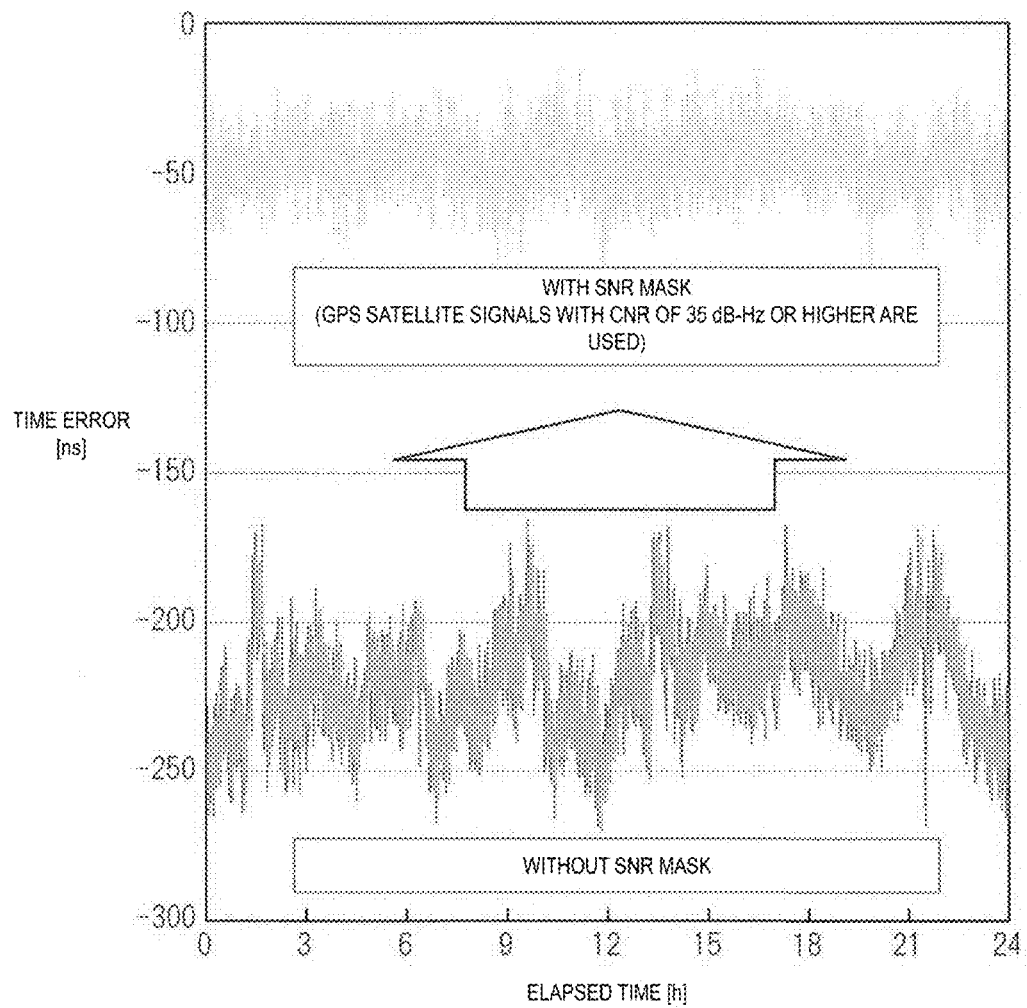
FIG. 17 shows deterioration of time accuracy in a multipath reception environment and measurement results of an improvement effect with an SNR mask.
Figure 18:
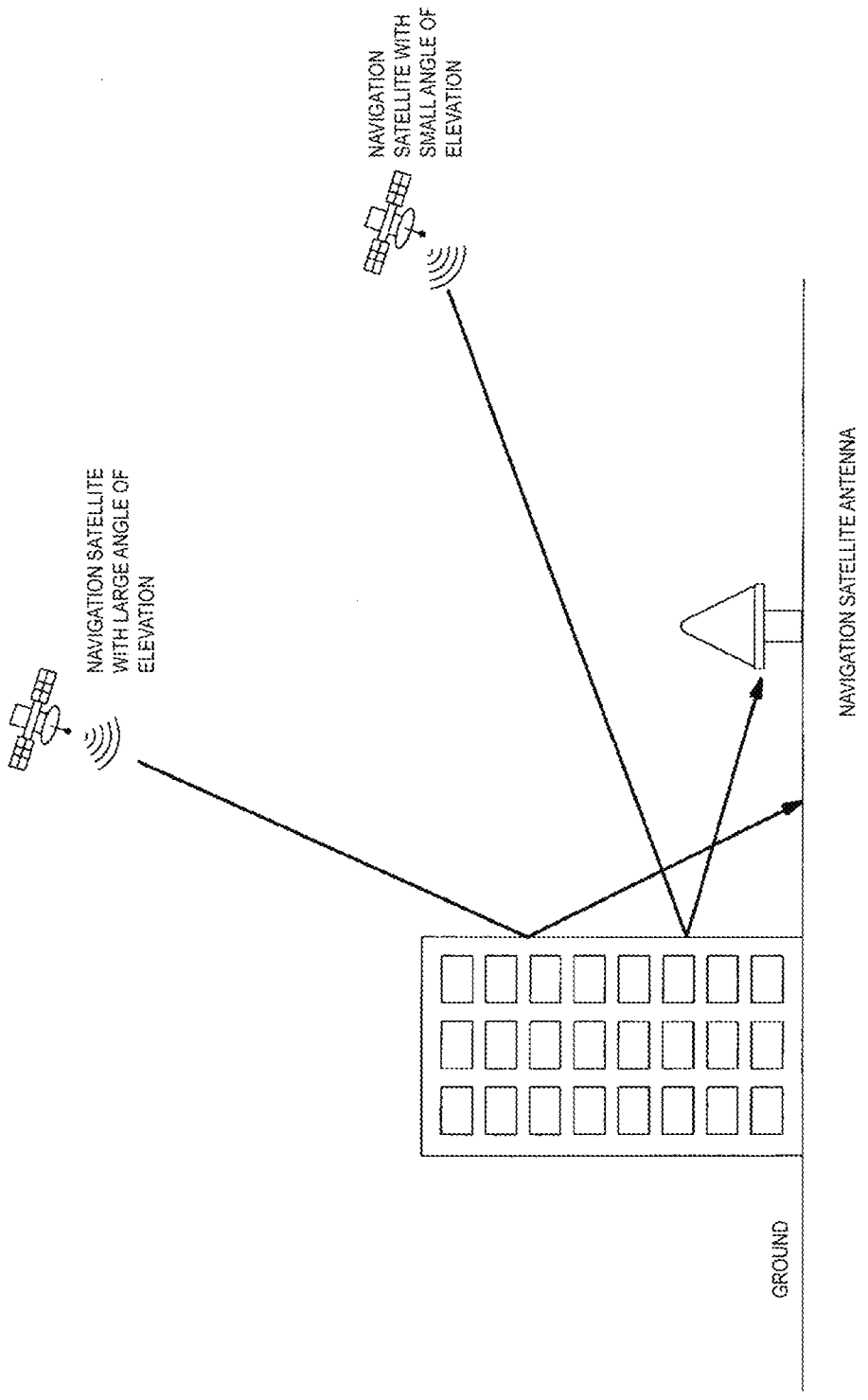
FIG. 18 is a schematic diagram illustrating a relationship between an angle of elevation of a navigation satellite and a reflected wave.
Figure 19:
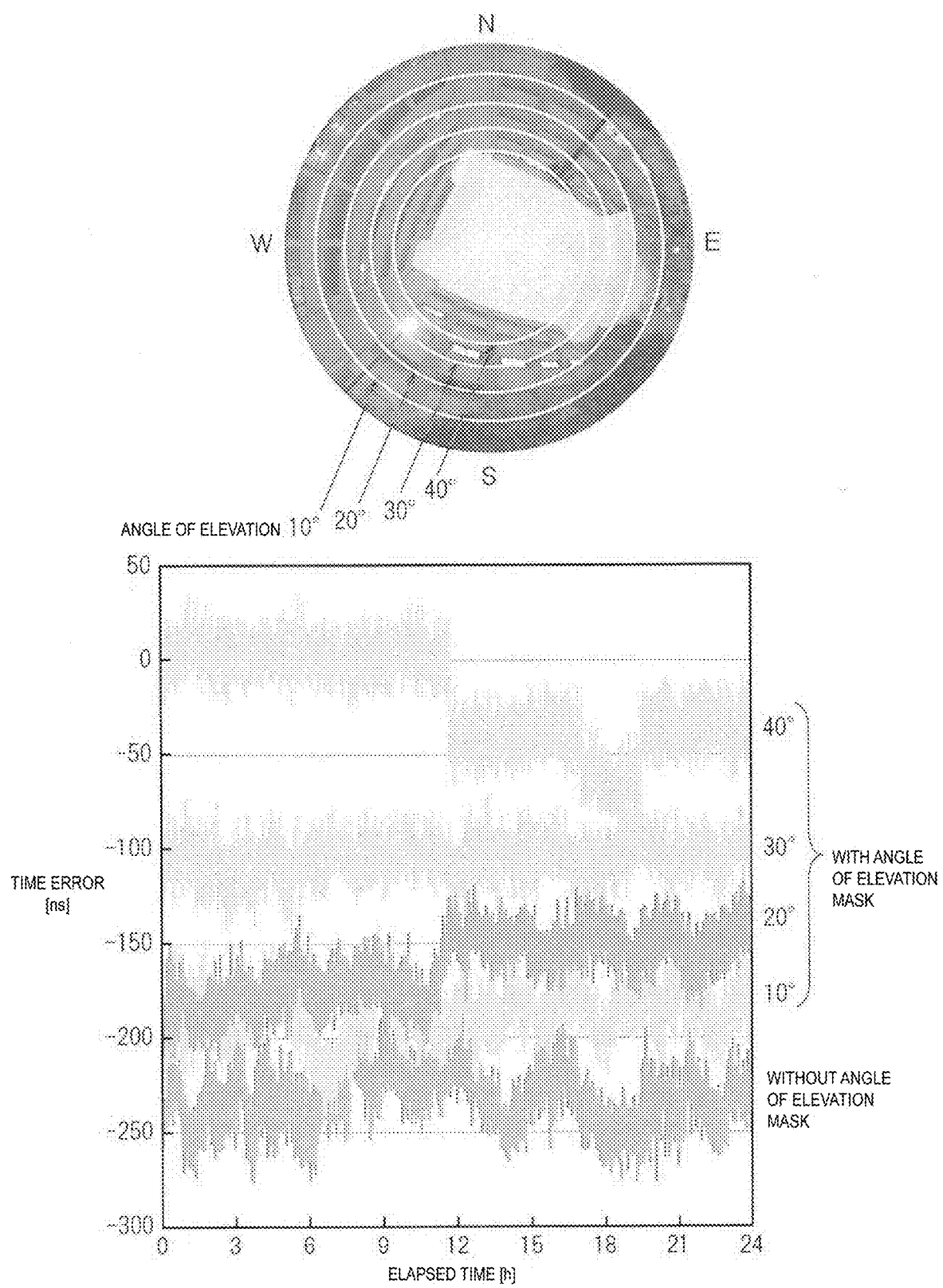
FIG. 19 shows deterioration of time accuracy in a multipath reception environment and measurement results of an improvement effect with an angle of elevation mask.

As can be understood from comparison between experiment results of FIGS. 6 and 17, in the present disclosure, effects of effectively eliminating influence of multipath signals of invisible satellite signals and improving time synchronization accuracy can be expected by selecting navigation satellite signals appropriate for use of time synchronization, regardless of reception characteristics of the navigation satellite antenna and performance of the navigation satellite signal reception apparatus.

As shown by experiment results of FIGS. 4 and 6, high time synchronization accuracy can be implemented by appropriately setting parameter values according to a reception environment.

In the present disclosure, navigation satellite signals to be used for time synchronization are selected in the navigation satellite signal reception apparatus, and thus there is no need to implement circular polarization isolation or isolation in the vertical direction in the navigation satellite antenna. As a result, costs for the navigation satellite antenna can be reduced.

As described above, according to the present disclosure, regardless of a reception environment of navigation satellite signals, that is both in an environment with an unsatisfactory reception environment, specifically an environment in which a necessary number of visible satellite signals cannot be temporarily captured, and in a satisfactory reception environment of open sky, highly accurate time information in synchronization with navigation satellite signals can be generated.

In the present disclosure, average values of arrival times of nCm combinations are computed in Procedures (B') and (B") described above. With this method, the amount of arithmetic operation is far less than that of a method of related art in which positioning and time synchronization arithmetic operation is preliminarily performed using combinations of a subset of navigation satellite signals of received navigation satellite signal and navigation satellite signals are selected through statistic processing. Accordingly, the present disclosure is less liable to cause a problem that arithmetic operation for satellite selection cannot be performed due to limitation on resources of signal processing in the navigation satellite system reception apparatus or that satellite selection cannot be performed timely due to computation time.

While one embodiment of the present disclosure has been described in detail in the above, the present disclosure is not limited to the above embodiment. For example, the time synchronization apparatus according to the embodiment described above implements a position estimation mode that does not require position information of a reception position. However, the time synchronization apparatus may adopt operation of first starting up with a position estimation mode, and then shifting to a position fixed mode based on a derived position. As one example of a trigger of causing a shift to a position fixed mode, algorithm for comparing a difference between a position calculated last time and a position calculated this time with a predetermined threshold, and determining a shift based on a state of variation of a derived position over time, i.e., a state of convergence of a derived position, may be conceivable.

In the embodiment described above, all of n received navigation satellite signals are a target of processing (see Step (I) of Procedure (B) and Steps (I) and (II) of Procedure (B') and Procedure (B") described above). However, to reduce the load of computation processing, the present disclosure may be applied after a predetermined number of navigation satellite signals are selected through masking processing using an angle of elevation mask or a CNR mask, for example.

In the embodiment described above, as an end condition in the recursive processing of Procedures (B), (B'), and (B") described above, a condition based on whether the processing time is a predetermined threshold or less is used. However, another end condition may be used. For example, any one of a condition of comparing a restart count with a predetermined threshold and a condition of comparing a difference between a position calculated last time and a position calculated this time with a predetermined threshold, or any combination of these above-mentioned conditions and a condition of comparing the processing time with a predetermined threshold may be used.

In the embodiment described above, a position of the navigation satellite antenna is fixed. However, the present disclosure can be applied even if the navigation satellite antenna is movable. In this case, update frequency of output of the position estimation mode is increased as necessary.

In the embodiment described above, one navigation satellite system is used. However, the present disclosure can also be applied in the use of a so-called multi-GNSS in which a plurality of navigation satellite systems are used in combination. In this case, enhancement of accuracy for increasing the number of visible satellite signals can be expected. As targets of combinations, not only a Global Navigation Satellite System (GNSS), but also a Regional Navigation Satellite System (RNSS) can be used. Examples of the global navigation satellite system include GPS, GLONASS, Galileo, and Beidou, and example of the regional navigation satellite system includes QZSS. When a plurality of navigation satellite systems are combined, the tolerable error value dT having a different value for each navigation satellite system by reflecting a time offset between the navigation satellite systems may be set.

In the embodiment described above, as an example of the navigation satellite system reception apparatus, the time synchronization apparatus has been described. However, the present disclosure can be also applied to a positioning apparatus so as to enhance positioning accuracy. Specifically, algorithm for selecting navigation satellite signals used for generation of time information in the time synchronization apparatus described above can be applied to generation of reception position information. In this case, reception position information resulting from positioning in Step (VII) of Procedure (B) or Step (VIII) of Procedures (B') and (B") described above may be output. Specifically, the positioning apparatus may include, among the configuration of the synchronization apparatus described above, the navigation satellite antenna 1, the navigation satellite signal reception unit 2, the control unit 4, and the setting unit 5, and may output reception position information resulting from positioning in the navigation satellite signal reception unit 2 in the procedures described above (Step (VII) of Procedure (B) or Step (VIII) of Procedures (B') and (B")). Note that the reception position information output unit may further be provided to output reception position information output by the navigation satellite signal reception unit 2 in a predetermined format or at predetermined timing.

Figure 12:
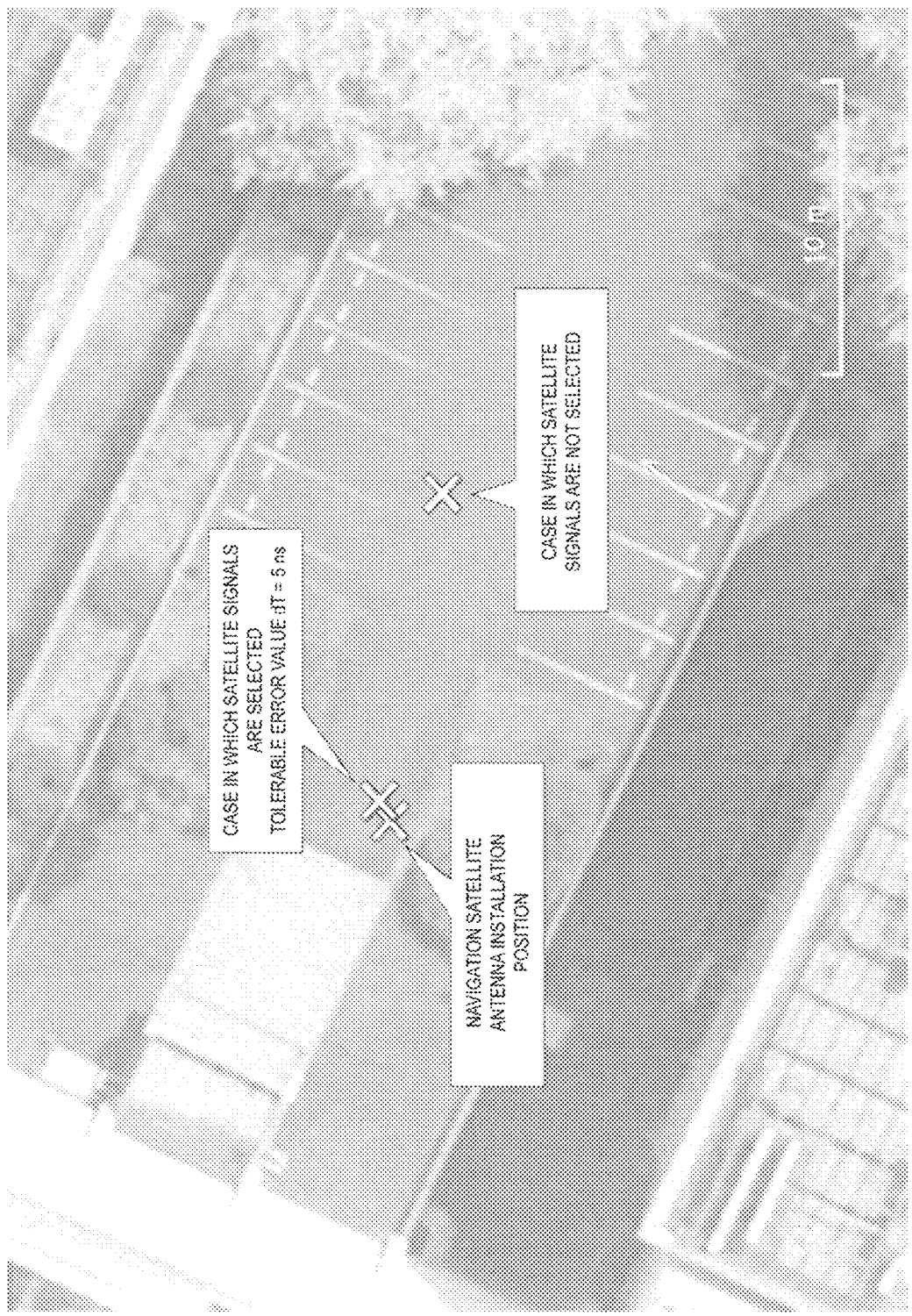
FIG. 12 illustrates measurement results of positioning accuracy in a multipath reception environment.
Figure 13:
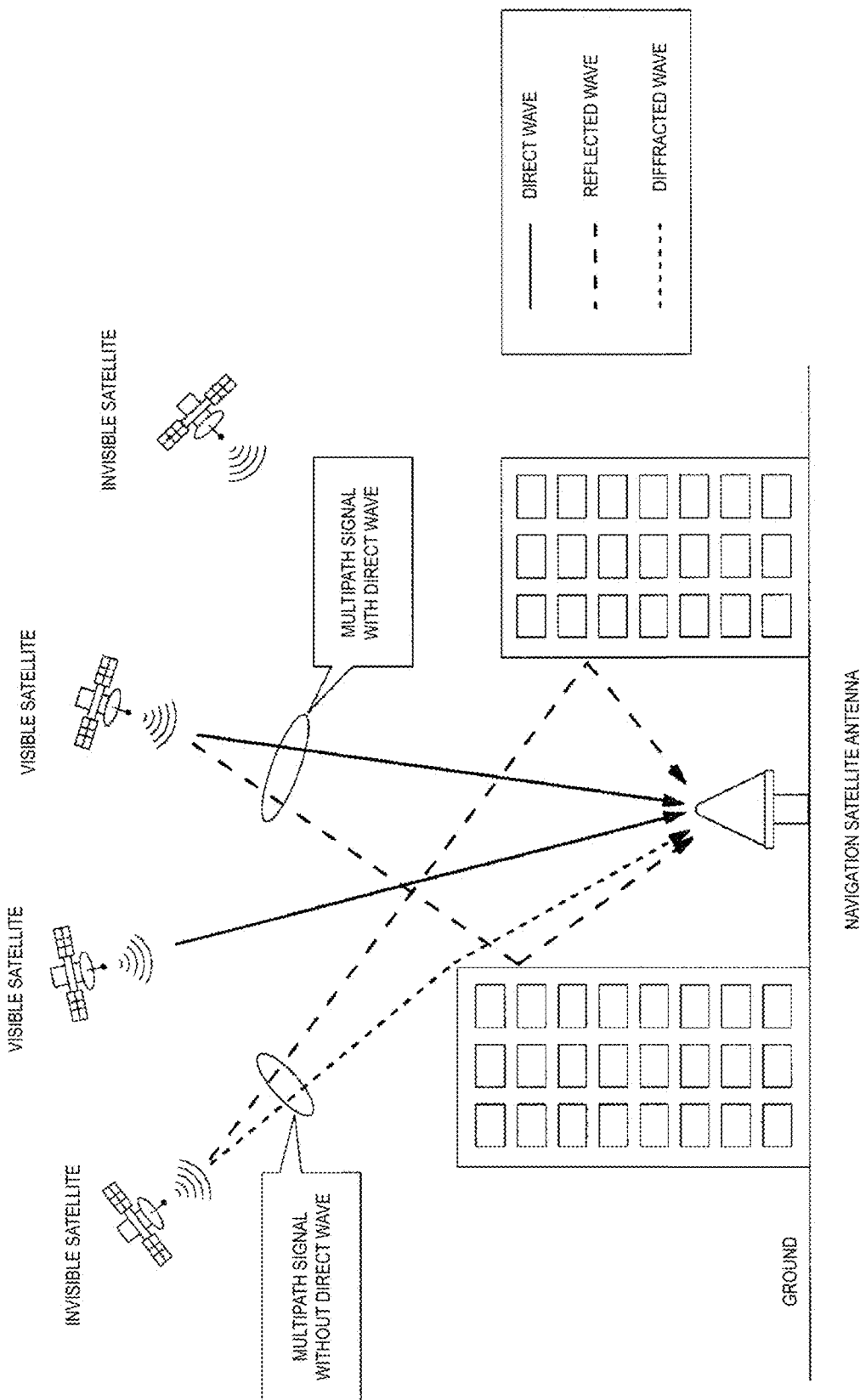
FIG. 13 is a schematic diagram for describing an occurrence state of multipath signals.

FIG. 12 illustrates results of measurement of positioning accuracy in a multipath reception environment illustrated in FIGS. 14 and 15 by using the positioning apparatus according to the embodiment described above. Procedure (B') is used, and m is set to 4. When the value of the tolerable error value dT ($dT_2$) is set to 5 ns, it is confirmed that positioning accuracy is significantly improved in comparison with a case in which satellite selection is not performed.

REFERENCE SIGNS LIST

1 Navigation satellite antenna
2 Navigation satellite signal reception unit
3 Time information generation unit
4 Control unit
5 Setting unit

The invention claimed is:

1. A navigation satellite system reception apparatus for performing, based on a plurality of navigation satellite signals received from a plurality of navigation satellites, at least one of positioning processing or time synchronization processing with one of the plurality of navigation satellites, the navigation satellite system reception apparatus comprising:
 a navigation satellite signal reception unit configured to calculate, based on first navigation satellite signals of the plurality of navigation satellite signals received from four or more navigation satellites of the plurality of navigation satellites, a first reception position and reception time; and
 a control unit configured to:
  calculate, based on each of the first navigation satellite signals received from the four or more navigation satellites, an initial value of the first reception position and an orbit position of each of the four or more navigation satellites,
  calculate, based on the calculated first reception position, the calculated orbit position, and time information included in each of the first navigation satellite signals, arrival time of each of the first navigation satellite signals,
  calculate an average value of the arrival time for each combination of the first navigation satellite signals,
  extract, based on the arrival time that is calculated, four or more second navigation satellite signals from the first navigation satellite signals, the four or more second navigation satellite signals being (i) arrived earlier than time obtained by adding a tolerable error value to the average value that is earliest or (ii) included in a combination with the average of the arrival time earlier than time obtained by adding the tolerable error value to the average value that is earliest,
  calculate, based on the extracted four or more second navigation satellite signals, a second reception position,
  recursively perform, by using the calculated second reception position, a calculation process of the arrival time, an extraction process of the second navigation satellite signal, and a calculation process of the second reception position, and
  perform, based on four or more third navigation satellite signals extracted, from the first navigation satellite signals, at end of recursive processing, the positioning processing or the time synchronization processing.

2. The navigation satellite system reception apparatus according to claim 1, wherein a parameter of an end condition for the recursive process includes processing time of the recursive process.

3. The navigation satellite system reception apparatus according to claim 1, wherein the tolerable error value is determined based on a reception state of the first navigation satellite signals.

4. The navigation satellite system reception apparatus according to claim 3, wherein, based on the reception state of the first navigation satellite signals being open sky environment, the determined tolerable error value is greater than a tolerable error value based on the reception state being multipath environment.

5. The navigation satellite system reception apparatus according to claim 1, wherein the tolerable error value increases with an increase in the estimated number of visible satellites.

6. A navigation satellite signal processing method used in a navigation satellite system reception apparatus for performing, based on a plurality of navigation satellite signals received from a plurality of navigation satellites, at least one of positioning processing or time synchronization processing with one of the plurality of navigation satellites, the navigation satellite system reception apparatus including a navigation satellite signal reception unit that is configured to calculate, based on first navigation satellite signals of the plurality of navigation satellite signals received from four or more navigation satellites of the plurality of navigation satellites, a first reception position and reception time, and a control unit that is configured to control the navigation satellite signal reception unit, the navigation satellite signal processing method comprising:
 calculating, by the control unit, based on each of the first navigation satellite signals received from the four or more navigation satellites, an initial value of the first reception position and an orbit position of each of the four or more navigation satellites,
 calculating, by the control unit, based on the calculated first reception position, the calculated orbit position, and time information included in each of the first navigation satellite signals, arrival time of each of the first navigation satellite signals,
 calculating, by the control unit, an average value of the arrival time for each combination of the first navigation satellite signals,
 extracting, by the control unit, based on the arrival time that is calculated, four or more second navigation satellite signals from the first navigation satellite signals, the four or more second navigation satellite signals being (i) arrived earlier than time obtained by adding a tolerable error value to the average value that is earliest or (ii) included in a combination with the average of the arrival time earlier than time obtained by adding the tolerable error value to the average value that is earliest,
 calculating, by the control unit, based on the extracted four or more second navigation satellite signals, a second reception position,
 recursively performing, by the control unit, by using the calculated second reception position, the calculating step of the arrival time, the extracting step of the second navigation satellite signal, and the calculating step of the second reception position, and
 performing, by the control unit, based on four or more third navigation satellite signals from the first navigation satellite signals extracted, from the first navigation satellite signals, at end of recursive processing, the positioning processing or the time synchronization processing.

7. The navigation satellite signal processing method according to claim 6, wherein a parameter of an end condition for the recursive process includes processing time of the recursive process.

8. The navigation satellite signal processing method according to claim 6, wherein the tolerable error value is determined based on a reception state of the first navigation satellite signals.

9. The navigation satellite signal processing method according to claim 8, wherein, based on the reception state of the first navigation satellite signals being open sky environment, the determined tolerable error value is greater than a tolerable error value based on the reception state being multipath environment.

10. The navigation satellite signal processing method according to claim 6, wherein the tolerable error value increases with an increase in the estimated number of visible satellites.

11. A non-transitory computer readable medium having stored thereon a navigation satellite signal processing program that causes a computer to perform operations comprising:

calculating, by a control unit, based on each of first navigation satellite signals received from four or more navigation satellites, an initial value of a first reception position and an orbit position of each of the four or more navigation satellites, calculating, by the control unit, based on the calculated first reception position, the calculated orbit position, and time information included in each of the first navigation satellite signals, arrival time of each of the first navigation satellite signals, calculating, by the control unit, an average value of the arrival time for each combination of the first navigation satellite signals, extracting, by the control unit, based on the arrival time that is calculated, four or more second navigation satellite signals from the first navigation satellite signals, the four or more second navigation satellite signals being (i) arrived earlier than time obtained by adding a tolerable error value to the average value that is earliest or (ii) included in a combination with the average of the arrival time earlier than time obtained by adding the tolerable error value to the average value that is earliest, calculating, by the control unit, based on the extracted four or more second navigation satellite signals, a second reception position, recursively performing, by the control unit, by using the calculated second reception position, the calculating step of the arrival time, the extracting step of the second navigation satellite signal, and the calculating step of the second reception position, and performing, by the control unit, based on four or more third navigation satellite signals extracted, from the first navigation satellite signals, at end of recursive processing, positioning processing or time synchronization processing.

12. The non-transitory computer readable medium according to claim 11, wherein a parameter of an end condition for the recursive process includes processing time of the recursive process.

13. The non-transitory computer readable medium according to claim 11, wherein the tolerable error value is determined based on a reception state of the first navigation satellite signals.

14. The non-transitory computer readable medium according to claim 13, wherein, based on the reception state of the first navigation satellite signals being open sky environment, the determined tolerable error value is greater than a tolerable error value based on the reception state being multipath environment.

15. The non-transitory computer readable medium according to claim 11, wherein the tolerable error value increases with an increase in the estimated number of visible satellites.

\* \* \* \* \*